US010038790B2

(12) United States Patent
Baek

(10) Patent No.: US 10,038,790 B2
(45) Date of Patent: Jul. 31, 2018

(54) COMMUNICATION SERVICE OPERATING METHOD AND ELECTRONIC DEVICE SUPPORTING THE SAME

(71) Applicant: Samsung Electronics Co., Ltd., Suwon-si (KR)

(72) Inventor: In Ho Baek, Yongin-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 14/927,176

(22) Filed: Oct. 29, 2015

(65) Prior Publication Data
US 2016/0127559 A1 May 5, 2016

(30) Foreign Application Priority Data
Oct. 30, 2014 (KR) ........................ 10-2014-0149489

(51) Int. Cl.
H04M 3/42 (2006.01)
H04M 3/54 (2006.01)
(Continued)

(52) U.S. Cl.
CPC ............ *H04M 3/543* (2013.01); *G06F 21/35* (2013.01); *H04L 65/1096* (2013.01); *H04W 4/16* (2013.01); *H04M 3/42263* (2013.01); *H04M 2203/2094* (2013.01); *H04M 2207/18* (2013.01); *H04W 4/008* (2013.01); *H04W 4/027* (2013.01)

(58) Field of Classification Search
CPC ......... G06F 3/017; G06F 21/35; H04W 92/18
USPC ......... 455/552.1, 436, 417, 418, 414.1, 410, 455/41.2, 411, 41.3, 423; 342/367; 370/329
See application file for complete search history.

(56) References Cited

U.S. PATENT DOCUMENTS 8,219,028 B1 * 7/2012 Flamholz ............. G06F 1/1694
455/41.2
8,983,441 B2 3/2015 Baek
(Continued)

FOREIGN PATENT DOCUMENTS

WO 2013125795 8/2013
WO 2014014204 1/2014

OTHER PUBLICATIONS

Communication with European Search Report dated Jan. 22, 2016 corresponding to European Application No. EP 15192380.2.
(Continued)

*Primary Examiner* — Kiet Doan
(74) *Attorney, Agent, or Firm* — McAndrews, Held & Malloy, Ltd.

(57) ABSTRACT

An electronic device includes: a first communication module configured to perform a call signal based communication and a second communication module configured to perform a short range communication or wired communication; and a processor configured to control call signal reception processing of the first communication module, wherein when an operation change of a communication channel established based on the second communication module, based on at least one of a movement of an electronic device and a movement of a second electronic device that is connected through the second communication module or has a connection history, the processor allows the electronic device or the second electronic device to receive the call signal.

16 Claims, 16 Drawing Sheets

(51) Int. Cl.
*H04W 4/16* (2009.01)
*H04L 29/06* (2006.01)
*G06F 21/35* (2013.01)
*H04W 4/00* (2018.01)
*H04W 4/02* (2018.01)

(56) References Cited

U.S. PATENT DOCUMENTS

| | | | |
|---|---|---|---|
| 2007/0086579 A1* | 4/2007 | Lorello | H04M 3/42263 379/45 |
| 2007/0273583 A1* | 11/2007 | Rosenberg | H04W 8/005 342/367 |
| 2008/0032689 A1 | 2/2008 | Kubota et al. | |
| 2011/0201275 A1* | 8/2011 | Jabara | H04L 12/5692 455/41.2 |
| 2012/0238215 A1* | 9/2012 | Kari | H04M 1/6066 455/41.3 |
| 2012/0289213 A1 | 11/2012 | Levien et al. | |
| 2013/0079037 A1* | 3/2013 | Dobyns | H04W 4/008 455/456.3 |
| 2013/0183950 A1 | 7/2013 | Hwang | |
| 2013/0217373 A1 | 8/2013 | Baek | |
| 2015/0181043 A1 | 6/2015 | Baek | |

OTHER PUBLICATIONS

European Office Action dated Jan. 25, 2017 corresponding to European Application No. EP 15192380.2.
Communication pursuant to Article 94(3) EPC corresponding to European Application No. EP 15192380.2.
Communication pursuant to Article 94(3) EPC dated Nov. 22, 2017 corresponding to European Application No. EP 15192380.2.
Summons to attend oral proceedings pursuant to Rule 115(1) EPC, dated May 6, 2018, in Application No. 15192380.2.

* cited by examiner

COMMUNICATION SERVICE OPERATING METHOD AND ELECTRONIC DEVICE SUPPORTING THE SAME

RELATED APPLICATION(S)

This application claims the benefit under 35 U.S.C. § 119(a) of a Korean patent application filed on Oct. 30, 2014 in the Korean Intellectual Property Office and assigned Serial number 10-2014-0149489, the entire disclosure of which is hereby incorporated by reference.

BACKGROUND

The present disclosure relates to a communication service operation of an electronic device.

An existing electronic device supports a communication service using a communication module. For example, an electronic device may establish a call signal (or call) based communication channel with another electronic device and may transmit/receive voice through the established communication channel. If a call signal cannot be received, such an existing electronic device provides a call forwarding (or call delivery) service for allowing another electronic device to receive a call signal corresponding to a user setting. In relation to the communication service operation of the existing electronic device, each time a call signal cannot be received, a user is required to repeatedly perform a setting for call forwarding. Additionally, each time a call-forwarding is unnecessary, it may be inconvenient that a call-forwarding setting is cancelled. As mentioned above, in relation to an existing electronic device, it is inconvenient that a user is required to control a call forwarding setting accurately and repeatedly corresponding to each situation.

SUMMARY

Accordingly, an aspect of the present disclosure is to provide a communication service operating method for performing an adaptive call forwarding setting corresponding to an electronic device operation situation and an electronic device supporting the same.

Another aspect of the present disclosure is to provide a communication service operating method for performing call forwarding to a specified electronic device based on a movement determination in a situation of operating a plurality of electronic devices and an electronic device supporting the same.

In accordance with an aspect of the present disclosure, an electronic device includes: a first communication module configured to perform a communication based on a call signal and a second communication module configured to perform a short range communication or wired communication; and a processor configured to control to process call signal reception associated with the first communication module, when an operation change of a communication channel established based on the second communication module occurs, wherein the processor allows at least one of the electronic device and a second electronic device to receive the call signal based on at least one of: a movement of the electronic device, a movement of the second electronic device that is connected through the second communication module, and a second electronic device that has a connection history.

In accordance with another aspect of the present disclosure, a communication service operating method includes: detecting an operation change of at least one of a short range communication and a wired-communication based communication channel; and in correspondence to the operation change, based on at least one of a movement of an electronic device, a movement of a second electronic device that is connected through a communication module, and a second electronic device that has a connection history, allowing at least one of the electronic device and the second electronic device to receive a call signal that is to be received from a communication service device.

DETAILED DESCRIPTION

Figure 1:
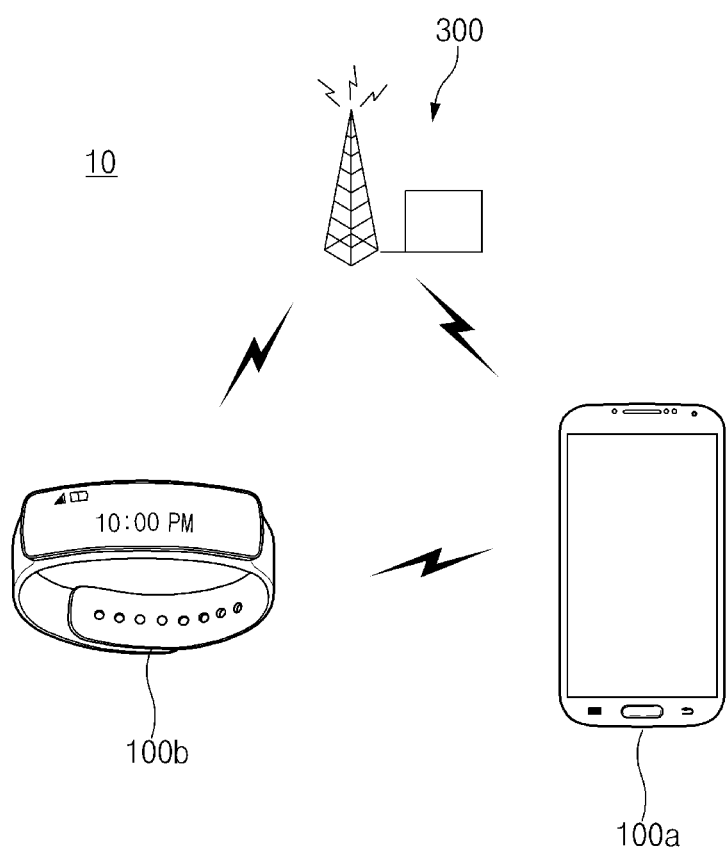
FIG. 1 is a view illustrating a communication service operation environment according to various embodiments of the present disclosure.

Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (e.g., a first component) is referred to as being "(operatively or communicatively) coupled with/to" or "connected to" another component (e.g., a second component), the component may be directly connected to the other component or connected through another component (e.g., a third component). In various embodiments of the present disclosure, it will be understood that when a component (e.g., a first component) is referred to as being "directly connected to" or "directly access" another component (e.g., a second component), another component (e.g., a third component) does not exist between the component (e.g., the first component) and the other component (e.g., the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (e.g., an embedded processor) for performing a corresponding operation or a generic-purpose processor (e.g., a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (e.g., smart glasses, head-mounted-devices (HMDs), electronic apparel, electronic bracelets, electronic necklaces, electronic appcessories, electronic tattoos, smart minors, and smart watches).

According to some embodiments of the present disclosure, an electronic device may be smart home appliances. The smart home appliances may include at least one of, for example, televisions, digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (e.g., Xbox™ and PlayStation™), electronic dictionaries, electronic keys, camcorders, and electronic picture frames.

According to some embodiments of the present disclosure, an electronic device may include at least one of various medical devices supporting call forwarding service (e.g., various portable measurement devices (e.g., glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (e.g., marine navigation systems, gyro compasses, etc.), avionics, security equipment, vehicle head units, industrial or household robots, financial institutions' automatic teller's machines (ATMs), or stores' point of sales (POS) or internet of things (e.g., bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (e.g., water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (e.g., an artificial intelligent electronic device).

FIG. 1 is a view illustrating a communication service operation environment according to various embodiments of the present disclosure.

Referring to FIG. 1, according to various embodiments of the present disclosure, a communication service operation environment 10 may include a first electronic device 100a, a second electronic device 100b, and a communication service device 300.

In the network environment 10, the first electronic device 100a and the second electronic device 100b may establish a short range communication channel (or a wired communication channel). For example, the first electronic device 100a and the second electronic device 100b may establish a short range communication channel based on at least one communication module of a Bluetooth communication module, a Bluetooth low energy (BLE) communication module, a Near field magnetic Induction (NFMI) communication module, and a WiFi direct communication module.

When an operation change (e.g., a link-loss, which may be a loss or disconnection of a link) of a mutually established short range communication channel occurs, at least one of the first electronic device 100a and the second electronic device 100b may check whether a movement of a specified form occurs. At least one of the first electronic device 100a and the second electronic device 100b may be set to perform call forwarding to an electronic device having a movement of a specified form. In relation to this, at least one of the first electronic device 100a and the second electronic device 100b may provide call forwarding related setting information to the communication service device 300. The call forwarding related setting information may be information set in advance. The call forwarding related setting information may be changed corresponding to a user input.

The first electronic device 100a may include a communication module for establishing a communication channel with another electronic device through the communication service device 300. For example, the first electronic device 100a may receive a call signal (or call) from another electronic device by communicating with the communication service device 300 (e.g., a mobile communication base station). Additionally, the first electronic device 100a may include a communication module for establishing a short range communication channel (or a wired communication channel) with the second electronic device 100b. According to various embodiments of the present disclosure, the first electronic device 100a may be a portable terminal or a wearable electronic device.

The first electronic device 100a may perform call forwarding switching (which may be a changing of a path setting to receive a call signal, or performing a call forward path change) in correspondence to a short range communication channel operation change with the second electronic device 100b. For example, when a link-loss (e.g., a state in which a link relating to a short range communication channel is disconnected due to a distance separation or a wireless environment change) occurs as a short range communication channel is established, the first electronic device 100a may process call forwarding switching automatically to allow the second electronic device 100b to receive a call that the first electronic device 100a itself is to receive.

According to various embodiments of the present disclosure, when a link-loss occurs, the first electronic device 100a may check whether there is a movement and may differently process call forwarding switching in correspondence to the movement. For example, when a movement state satisfies a specified condition (e.g., a movement size is equal to or greater than a specified size), the first electronic device 100a may not perform call forwarding switching. Accordingly, upon the receipt of call, the first electronic device 100a may perform information output corresponding to the call reception. Alternatively, when a movement state does not satisfy a specified condition (e.g., the first electronic device 100a is stopped), the first electronic device 100a may perform call forwarding switching. Accordingly, a call that is to be received by the first electronic device 100a may be delivered to the second electronic device 100b.

According to various embodiments of the present disclosure, the first electronic device 100a may maintain a communication module to be turned off or turned on according to whether call forwarding switching is performed. For example, when call forwarding switching is required, the first electronic device 100a may turn off a communication module communicating with the communication service device 300. Alternatively, when call forwarding switching is not required, the first electronic device 100a may maintain a communication module communicating with the communication service device 300 to be in a turn off state.

Similarly to the first electronic device 100a, the second electronic device 100b may include a communication module for establishing a communication channel with another electronic device through the communication service device 300. Additionally, the second electronic device 100b may include a communication module for establishing a short range communication channel (or a wired communication channel) with the first electronic device 100a. According to various embodiments of the present disclosure, the second electronic device 100b may be a wearable electronic device or a portable terminal.

Additionally, the second electronic device 100b may perform call forwarding processing in correspondence to a short range communication channel operation change with the first electronic device 100a. According to an embodiment of the present disclosure, when a call forwarding switching service is set only for the first electronic device 100a, the second electronic device 100b may receive a call forwarded by the first electronic device 100a in correspondence to a setting of the communication service device 300 of the first electronic device 100a.

According to various embodiments of the present disclosure, when a call forwarding switching service is set for the first electronic device 100a and the second electronic device 100b, the second electronic device 100b may perform a call forwarding switching process corresponding to whether there is a movement. For example, when a link-loss of a short range communication channel established with the first electronic device 100a occurs or is detected, the second electronic device 100b may check whether there is a movement. When the movement is more than or equal to a specified value or size, the second electronic device 100b may be set not to perform call forwarding switching and process a call reception. When the movement is less than a specified value or size, the second electronic device 100b may perform call forwarding to the first electronic device 100a.

In relation to a movement occurrence check, according to various embodiments of the present disclosure, the second electronic device 100b may check movement related sensing information with the first electronic device 100a. The second electronic device 100b may collect movement related sensing information of the second electronic device 100b, and movement related sensing information of the first electronic device 100a, and may compare the movement related sensing information. During this operation, the second electronic device 100b (or the first electronic device 100a) may process a call to be received by an electronic device having more than a specified movement state value or a specified value (e.g., "1" if there is a movement and "0" if there is no movement). Alternatively, the second electronic device 100*b* (or the first electronic device 100*a*) may process a call to be received by an electronic device having a relatively greater movement state value.

According to various embodiments of the present disclosure, the first electronic device 100*a* and the second electronic device 100*b* may determine each movement occurrence based on sensing information that they collect. Accordingly, the first electronic device 100*a* and the second electronic device 100*b* may share only information on whether a movement occurs by replacing the sensing information. For example, the first electronic device 100*a* and the second electronic device 100*b* may share only information on whether a movement state is greater or less than a specified based on the collected sensing information. According to various embodiments of the present disclosure, when a movement state is greater than a specified value based on the sensing information, the first electronic device 100*a* and the second electronic device 100*b* may share a specified value (e.g., a value of "1" or "0") or when the movement state is less than the specified value, may share a specified value (e.g., a value of "0" or "1").

In relation to movement related sensing information sharing, the second electronic device 100*b* may collect sensing information sensed by operating a sensor module in a specified period or in real time before link-loss occurrence. The second electronic device 100*b* may share the sensing information through a short range communication channel or a communication channel based on the communication service device 300. Alternatively, the second electronic device 100*b* may collect sensing information by activating a sensor module after link-loss occurrence. The second electronic device 100*b* may share the collected sensing information with the first electronic device 100*a* through the communication service device 300.

The communication service device 300 may support a call signal (or call) based communication service of the first electronic device 100*a* or the second electronic device 100*b*. According to an embodiment of the present disclosure, the communication service device 300 may include a base station and may process a call signal delivery between the first electronic device 100*a* and the second electronic device 100*b*, which are connected (or in a camping-on state). According to various embodiments of the present disclosure, the communication service device 300 may change a delivery path of a call signal in correspondence to a request of the first electronic device 100*a* or the second electronic device 100*b*. For example, in correspondence to a call forwarding switching setting of the first electronic device 100*a*, the communication service device 300 may deliver a call that is to be delivered to the first electronic device 100*a* (or the second electronic device 100*b*) to the second electronic device 100*b* (or the first electronic device 100*a*). According to various embodiments of the present disclosure, when a communication module operated based on a call signal is in a turn-off state, the communication service device 300 may automatically change a call forwarding path based on call forwarding information set in relation to a corresponding electronic device.

Figure 2:
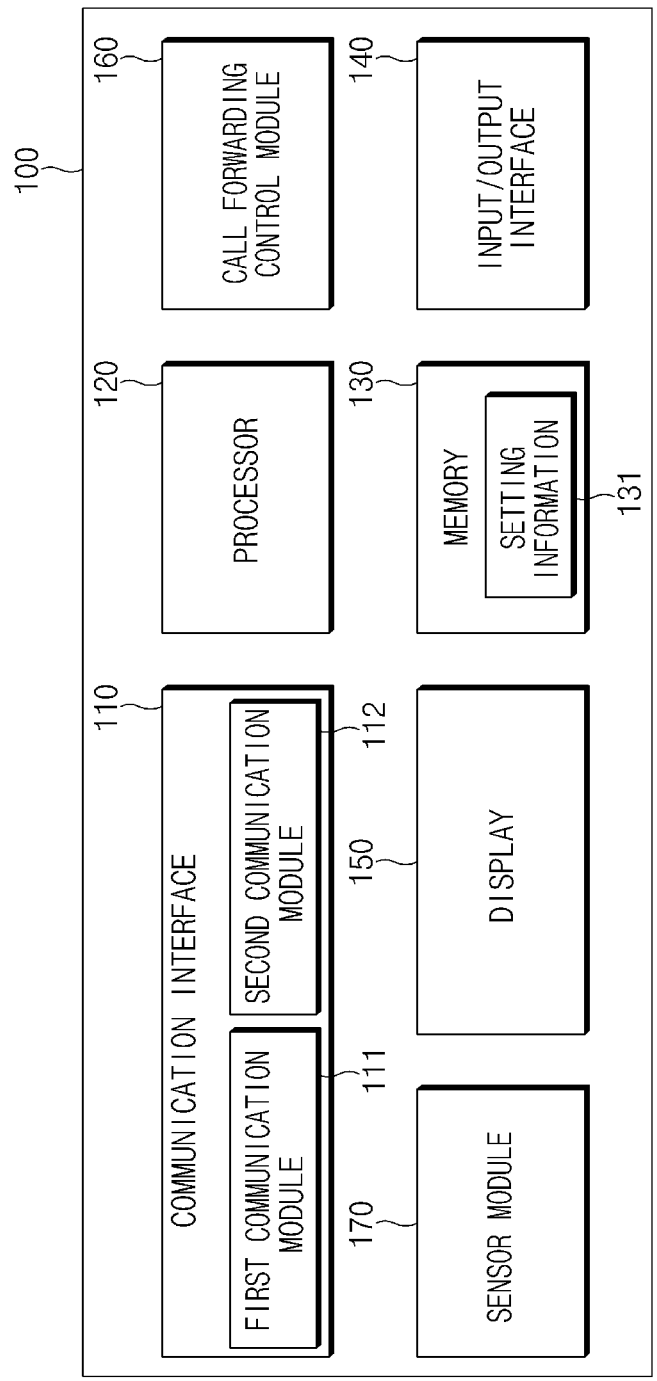
FIG. 2 is a schematic block diagram illustrating a configuration of an electronic device according to various embodiments of the present disclosure.

FIG. 2 is a schematic block diagram illustrating a configuration of an electronic device according to various embodiments of the present disclosure. An electronic device shown in FIG. 2 may be at least one of the first electronic device 100*a* and the second electronic device 100*b*, which are described with reference to FIG. 1. Alternatively, the first electronic device 100*a* or the second electronic device 100*b* may include only some of components included in the electronic device 100. Accordingly, in the description below, as the electronic device 100 is described by referring to the first electronic device 100*a* or the second electronic device 100*b*, if necessary, whether to add or exclude each component in each electronic device (e.g., the first electronic device 100*a* or the second electronic device 100*b*) or its related description is provided.

Referring to FIG. 2, the electronic device 100 may include a communication interface 110, a processor 120, a memory 130, an input/output interface 140, a display 150, a call forwarding control module 160, and a sensor module 170.

The communication interface 110 may include a first communication module 111 and a second communication module 112. The first communication module 111, for example, may support a communication channel establishment of the first electronic device 100*a* or the second electronic device 100*b* through the communication service device 300. According to an embodiment of the present disclosure, the first communication module 111 may receive a call signal from an external electronic device through a base station device included in the communication service device 300. The first communication module 111 may have a turn-off state or a turn-on state corresponding to a call forwarding setting. According to various embodiments of the present disclosure, the first communication module 111 may receive a voice call signal or a video call signal.

The second communication module 112 may be a short range communication module. For example, the second communication module 112 may include at least one of a Bluetooth communication module, a Bluetooth low energy (BLE) communication module, a Near Field Magnetic Induction (NFMI) communication module, and a WiFi direct communication module. Alternatively, the second communication module 112 may include a wired communication module. When the second communication module 112 is configured with a wired communication module, a cable for a wired communication connection between the first electronic device 100*a* and the second electronic device 100*b* may be further prepared.

In the second communication module 112, a link-loss may occur in correspondence to a distance separation with another electronic device (e.g., the first electronic device 100*a* or the second electronic device 100*b*) or a wireless environment change. Additionally, when two electronic devices (e.g., the first electronic device 100*a* and the second electronic device 100*b*) are disposed within a predetermined distance, the second communication module 112 may re-establish (or reconnect) a previously disconnected short range communication channel. In relation to this, when a link-loss occurs, the second communication module 112 may perform surrounding search or standby based on a BLE communication module. According to various embodiments of the present disclosure, the second communication module 112 may establish a short range communication channel based on at least one of a Bluetooth communication module, an NFMI communication module, and a WiFi Direct communication module before a link-loss. After a link-loss occurs, the second communication module 112 may search for other electronic device (e.g., the first electronic device 100*a* or the second electronic device 100*b*) by using a BLE communication module. When a specified electronic device (e.g., the first electronic device 100*a* or the second electronic device 100*b*) is found based on a BLE communication module, the second communication module 112 may establish a short range communication channel based on another communication module (e.g., a Bluetooth communication module, an NFMI communication module, and a WiFi Direct communication module).

The processor 120 may perform a variety of job processing relating to a function performance of the electronic device 100. For example, the processor 120 may process a hardware control, which relates to a short range communication establishment relating to a call forwarding operation, whether there is a movement, call forwarding switching, the activation or deactivation of the first communication module 111, a module type selection of the second communication module 112, and a reconnection of the second communication module 112 in a link-loss state.

The memory 130 may store various programs and user information relating to an operation of the electronic device 100. For example, the memory 130 may store operating system (OS) or various applications. According to an embodiment of the present disclosure, the memory 130 may store setting information 131. The setting information 131 may include information relating to call forwarding in correspondence to an operation state of the electronic device 100. For example, when a link-loss relating to a short range communication channel occurs, the memory of the first electronic device 100a (or the second electronic device 100b) may store the setting information 131 for setting a call to be forwarded to the second electronic device 100b (or the first electronic device 100a).

According to various embodiments of the present disclosure, when a link-loss relating to a short range communication channel occurs, the memory of the first electronic device 100a (or the second electronic device 100b) may store the setting information 131 for performing call forwarding switching corresponding to whether there is a movement. Alternatively, when call forwarding switching (e.g., a call that is to be received by the first electronic device 100a is delivered to the second electronic device 100b or a call to be received by the second electronic device 100b is delivered to the first electronic device 100a), the setting information 131 may include information for deactivating the first communication module 111 When call forwarding switching is required, or at a specified timing, the setting information may be delivered to the communication service 300.

The input/output interface 140 may generate an input signal relating to an operation of the electronic device 100 corresponding to a user input and may deliver this to the call forwarding control module 160 or the processor 120. According to an embodiment of the present disclosure, the input/output interface 140 may generate an input signal relating to whether to perform call forwarding switching in correspondence to a link-loss occurrence. The input/output interface 140 may generate an input signal relating to which electronic device a call is to be forwarded during call forwarding switching. The input/output interface 140 may generate an input signal relating to a setting for deactivating the first communication module 111 during call forwarding switching. When a link-loss occurs, the input/output interface 140 may generate an input signal for applying call forwarding switching manually or canceling call forwarding switching.

According to various embodiments of the present disclosure, the input/output interface 140 may include an audio module (not shown). The audio module may output or produce an audio for guiding a short range communication channel establishment, and an audio for guiding a link-loss occurrence relating to a short range communication channel. Additionally, when a link-loss occurs, the audio module may output an audio for guiding call forwarding switching or call forwarding non-switching.

Additionally, during call forwarding switching, the audio module may output or produce an audio for guiding to which electronic device a call is forwarded. According to an embodiment, the electronic device may have specific audio data which is explaining setting states for call forwarding switching. Additionally, when another electronic device sets call forwarding switching, the audio module may output or produce an audio for guiding electronic device information that sets call forwarding switching (e.g., phone numbers or device names) when an event for call forwarding witching occurs or is detected. In relation to this, after call forwarding switching, another electronic device may transmit information on call forwarding switching setting and its identification information to an electronic device that is to receive a call (e.g., transmit them through the call service device 300).

The input/output interface 140 may be in forms in different electronic devices. For example, the input/output interface 140 of the second electronic device 100b in a wearable electronic device form may be different from the input/output interface 140 of the first electronic device 100a in a smartphone electronic device form.

The display 150 may output various screens relating to an operation of the electronic device 100. For example, the display 150 may output a standby screen, a home screen, and a specific function performance screen of the electronic device 100. According to an embodiment of the present disclosure, when a short range communication channel is established between the first electronic device 100a and the second electronic device 100b, the display 150 may output or display a screen for guiding a communication channel establishment corresponding thereto. The screen for guiding may have at least one of image or text which is explaining setting states for call forwarding switching. The display 150 may output or display the screen for guiding when an event for call forwarding switching occurs or is detected. Additionally, the display 150 of the first electronic device 100a (or the second electronic device 100b) may output information for guiding an activation of the sensor module 170, information corresponding to a link-loss occurrence between the first electronic device 100a and the second electronic device 100b, and information relating to call forwarding switching in correspondence to a link-loss occurrence. Additionally, the display 150 of the first electronic device 100a (or the second electronic device 100b) may output or display information for guiding a re-establishment (or reconnection) of a short range communication channel and information for guiding a restoration of a switched call forwarding state. According to the hardware characteristics of the first electronic device 100a or the second electronic device 100b, information to be outputted to the display 150 may be outputted as audio information corresponding thereto.

The sensor module 170 may include at least one sensor relating to a movement measurement of the electronic device 100. For example, although not shown, the sensor module 170 may include at least one of an acceleration sensor, a geomagnetic sensor, and a gyro sensor. Additionally, although not shown, the sensor module 170 may include a location information collection sensor (e.g., a GPS module) for detecting a location change of the electronic device 100. According to an embodiment of the present disclosure, when a short range communication channel is established, the sensor module 170 may be activated automatically to collect sensing information (e.g., an acceleration sensor value and a gyro sensing value, which are changed corresponding to an occurrence of a movement) relating to a movement determination. The sensor module 170 may transmit the collected sensing information (e.g., an acceleration sensing value or a gyro sensing value) to another electronic device (e.g., the first electronic device 100a or the second electronic device 100b) in real time, or in a predetermined period through a specific communication module (e.g., at least one of a communication channel using the first communication module 111 and a short range communication channel using the second communication module 112). According to various embodiments of the present disclosure, when a link-loss relating to a short range communication channel occurs, the sensor module 170 is activated to collect sensing information relating to a movement determination for a predetermined period. The collected sensing information may be transmitted to another electronic device by using the first communication module 111.

The call forwarding control module 160 may perform call forwarding control related processing. At least part of the call forwarding control module 160 may be implemented with at least one processor (not shown). Alternatively, at least part of the processor 120 may include the call forwarding control module 160. According to an embodiment of the present disclosure, the call forwarding control module (or the call forwarding control module of the second electronic device 100b) of the first electronic device 100a may control a short range communication channel establishment between the first electronic device 100a and the second electronic device 100b corresponding to a user input or a scheduled job order. During this operation, the call forwarding control module (or the call forwarding control module of the second electronic device 100b) of the first electronic device 100a may establish at least one of Bluetooth communication connection, BLE based communication connection, NFMI based communication connection, ear-to-ear (E2E) wireless based communication connection, and WiFi Direct communication connection, with the second electronic device 100a (or the first electronic device 100b).

The call forwarding control module 160 may check whether there is a setting relating to call forwarding switching in correspondence to a short range communication channel operation change (e.g., a link-loss occurrence), and may process call forwarding switching corresponding thereto. During this operation, the call forwarding control module 160 may check whether a movement occurs (e.g., a movement of at least one of the first electronic device 100a and the second electronic device 100b occurs). The call forwarding control module 160 may allow an electronic device having a movement of more than a specified value or size to receive a call.

According to various embodiments of the present disclosure, the call forwarding control module 160 may turn off the first communication module 111 (e.g., a first communication module of the first electronic device 100a or a first communication module of the second electronic device 100b) of an electronic device that is not to receive call. Additionally, when a link-loss of a short range communication channel occurs, the call forwarding control module 160 may change a communication method (e.g., change from a Bluetooth communication connection method between the first electronic device 100a and the second electronic device 100b into a BLE communication method).

Figure 3:
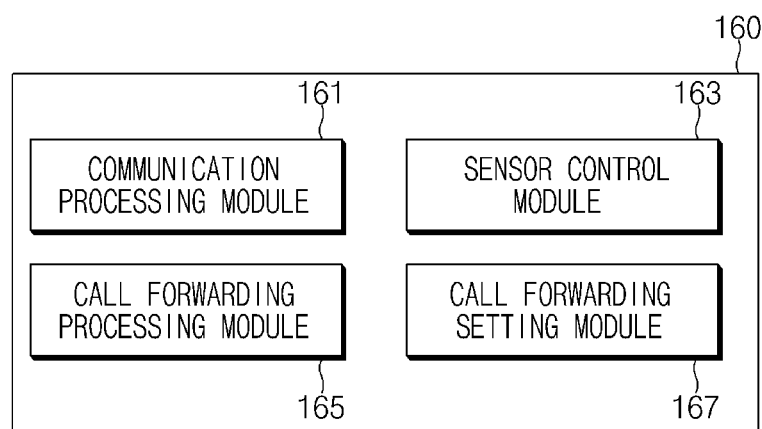
FIG. 3 is a block diagram illustrating a call forwarding control module according to various embodiments of the present disclosure.

FIG. 3 is a block diagram illustrating a call forwarding control module (similar to the call forwarding control module 160 of FIG. 2) according to various embodiments of the present disclosure.

Referring to FIG. 3, the call forwarding control module 160 may include a communication processing module 161, a sensor control module 163, a call forwarding processing module 165, and a call forwarding setting module 167.

The communication processing module 161 may control an operation of the second communication module 112. For example, the communication processing module 161 may activate the second communication module 112 to perform surrounding search in correspondence to an input event occurrence or in correspondence to preset scheduled information. When an electronic device (e.g., the first electronic device 100a or the second electronic device 100b) is found, the communication processing module 161 may establish a short range communication channel (or a wired communication channel) automatically or in correspondence to a user input. The communication processing module 161 may check whether there is a call forwarding switching setting during a communication channel establishment. If there is a call forwarding switching setting, information relating to a short range communication channel establishment may be provided to the sensor control module 163.

According to various embodiments of the present disclosure, the communication processing module 161 may check a link-loss occurrence relating to a communication channel based on the second communication module 112. The communication processing module 161 may deliver a link-loss occurrence to the call forwarding processing module 165. According to various embodiments of the present disclosure, when a link-loss occurs, the communication processing module 161 may perform surrounding search in a predetermined period or in real time, or may change into a search signal reception state to check whether an electronic device having a history of establishing a short range channel enters a communicable range. When an electronic device where a link-loss occurs enters a communicable range, the communication processing module 161 may re-establish a short range communication channel. When a short range communication channel is re-established, the communication processing module 161 may deliver information relating to the channel re-establishment to the call forwarding processing module 165.

When receiving a short range communication channel establishment from the communication processing module 161, the sensor control module 163 may activate the sensor module 170. The sensor control module 163 may transmit sensing information that the sensor module 170 collects to another electronic device. According to an embodiment of the present disclosure, when a call forwarding switching function is set for one electronic device (e.g., the first electronic device 100a), the sensor control module 163 of the first electronic device 100a may activate the sensor module 170 and the sensor module 170 of the second electronic device 100b may have an inactivation state. The sensor control module 163 may provide information that the sensor module 170 collects to the call forwarding processing module 165. According to various embodiments of the present disclosure, corresponding to a short range communication channel establishment, the sensor module of the first electronic device 100a and the sensor control module of the second electronic device 100b may activate each sensor module to collect sensing information relating to a movement. The collected sensing information may be delivered to another electronic device (e.g., the first electronic device 100a or the second electronic device 100b).

According to various embodiments of the present disclosure, when receiving information on a link-loss occurrence, the sensor control module 163 may activate the sensor module 170. The sensor control module 163 may deliver information that the sensor module 170 collects to the call forwarding processing module 165. According to an embodiment of the present disclosure, when sensing information relating to a movement may be set to be shared with another electronic device (e.g., the first electronic device 100a or the second electronic device 100b), the sensor control module 163 may transmit the sensing information to another electronic device by using the first communication module 111. Alternatively, according to various embodiments of the present disclosure, the sensor control module 163 may determine whether there is a movement based on movement related sensing information that the sensor module 170 provides, and may transmit, to another electronic device, information on whether there is a movement or whether a movement state is greater or less than a specified value (e.g., if it is greater than the specified value, a value of "1" and if it is less than the specified value, a value of "0".).

The call forwarding processing module 165 may control call forwarding switching corresponding to a setting. For example, when a link-loss occurs from the communication processing module 161, the call forwarding processing module 165 may analyze sensing information that the sensor control module 163 provides, determines, senses, or collects. During this operation, the call forwarding processing module 165 may check whether its movement state is greater than a specified value. If its movement state is greater than the specified value, the call forwarding processing module 165 may receive a call. When a movement (e.g., the first electronic device 100a) is less than a specified value (e.g., the first electronic device 100a is fixed), the call forwarding processing module 165 may process call forwarding switching to allow another electronic device (e.g., the second electronic device 100b) to receive a call.

According to various embodiments of the present disclosure, when receiving sensing information from another electronic device (e.g., the second electronic device 100b), the call forwarding processing module 165 of the first electronic device 100a may analyze the sensing information and determine a movement state of the other electronic device (e.g., the second electronic device 100b). When the second electronic device 100b shows a movement of more than a specified value, the call forwarding processing module 165 of the first electronic device 100a may process call forwarding switching to allow the second electronic device 100b to receive a call that the first electronic device 100a is to receive. When a movement state of the second electronic device 100b is less than a specified value, the call forwarding processing module 165 of the first electronic device 100a may release call forwarding. Alternatively, when a movement state is less than a specified value, the first electronic device 100a may process a call that the first electronic device 100a is to receive to be received by the first electronic device 100a. According to various embodiments of the present disclosure, the call forwarding processing module 165 may turn off the first communication module 111 in relation to call forwarding processing. For example, when the call forwarding processing module 165 of the first electronic device 100a performs processing to allow the second electronic device 100b to receive a call, the first electronic device 100a may turn off its first communication module 111. According to various embodiments of the present disclosure, when the call forwarding processing module 165 of the second electronic device 100b performs processing to allow the first electronic device 100a to receive a call, the call forwarding processing module 165 of the second electronic device 100b may turn off its first communication module 111. Alternatively, when the call forwarding processing module 165 receives a call, the call forwarding processing module 165 may turn on its first communication module 111.

According to various embodiments of the present disclosure, when receiving information on a short range communication channel re-establishment from the communication processing module 161, the call forwarding processing module 165 may restore a call forwarding switching state to an initial value. For example, when call forwarding is switched corresponding to a link-loss occurrence relating to a short range communication channel (e.g., set to allow the second electronic device 100b to receive a call of the first electronic device 100a), the call forwarding processing module 165 may be restored to a previous state (e.g., set to allow the first electronic device 100a to receive its own call).

According to various embodiments of the present disclosure, the call forwarding processing module 165 may check a link-loss occurrence interval. When waiting without processing call forwarding switching after a link-loss occurs, if a specified time elapses, the call forwarding processing module 165 may process call forwarding switching.

The call forwarding setting module 167 may support a call forwarding setting of the electronic device 100. For example, when a link-loss relating to a short range communication channel occurs, the call forwarding setting module 167 may provide a screen for determining whether to automatically or manually perform call forwarding switching. Additionally, after a link-loss occurrence of electronic devices establishing a short range communication channel (e.g., the first electronic device 100a and the second electronic device 100b), the call forwarding setting module 167 may check a movement value of the electronic devices. When all movement values are greater or less than a specified value, the call forwarding setting module 167 may provide a screen for setting an electronic device that is to receive a call by default. Additionally, when call forwarding switching is executed (e.g., when a link-loss occurs or a short range communication channel where a link-loss occurs is re-established), the call forwarding setting module 167 may provide a screen for manually selecting by which electronic device a call of two electronic devices (e.g., the first electronic device 100a and the second electronic device 100b) is to be received.

According to various embodiments of the present disclosure, an electronic device may include a memory for storing at least one instruction relating to call signal processing and a processor connected to the memory. The processor may allow an electronic device itself or another electronic device to receive a call signal to be received through a base station network specified based on at least one of a movement of the electronic device itself or a movement of the other electronic device connected through the second communication module or having a connection history during a communication channel operation change.

As mentioned above, according to various embodiments of the present disclosure, an electronic device may include a first communication module configured to perform a call signal based communication and a second communication module configured to perform a short range communication or wired communication; and a call forwarding control module configured to control call signal reception processing of the first communication module, wherein when an operation change of a communication channel established based on the second communication module, based on at least one of a movement of an electronic device itself and a movement of another electronic device that is connected through the second communication module or has a connection history, the call forwarding control module may allow the electronic device itself or the other electronic device to receive the call signal.

According to various embodiments of the present disclosure, the call forwarding control module may determine a movement state of the electronic device based on sensing information obtained from the sensor module and when the movement state of the electronic device is less than a specified value, perform processing to allow the other electronic device to receive the call signal.

According to various embodiments of the present disclosure, the call forwarding control module may determines a movement state of the electronic device itself based on sensing information obtained from a sensor module and when the movement state of the processor is equal to or greater than a specified value, perform processing to allow the electronic device itself to receive the call signal.

According to various embodiments of the present disclosure, the call forwarding control module may determine a movement state of the other electronic device based on sensing information received from the other electronic device or check a movement state value received from the other electronic device, and when the movement state of the other electronic device is less than a specified value, perform processing to allow the electronic device itself to receive the call signal.

According to various embodiments of the present disclosure, the call forwarding control module may determine a movement state of the other electronic device based on sensing information received from the other electronic device or check a movement state value received from the other electronic device, and when the movement state of the other electronic device is equal to or greater than a specified value, allow the other electronic device to receive the call signal.

According to various embodiments of the present disclosure, the call forwarding control module may process a reception path setting of the call signal corresponding to the movement determination when a link-loss of the short range communication occurs.

According to various embodiments of the present disclosure, the call forwarding control module may restore a call forwarding state switched corresponding to the link-loss occurrence to a previous state when the link is reconnected.

According to various embodiments of the present disclosure, the call forwarding control module may output a call forwarding switching or call forwarding non-switching selection related item.

According to various embodiments of the present disclosure, the call forwarding control module may turn off the first communication module when call forwarding is switched.

According to various embodiments of the present disclosure, the call forwarding control module may provide setting information relating to call forwarding switching to a communication service device relating to the first communication module.

Figure 4:
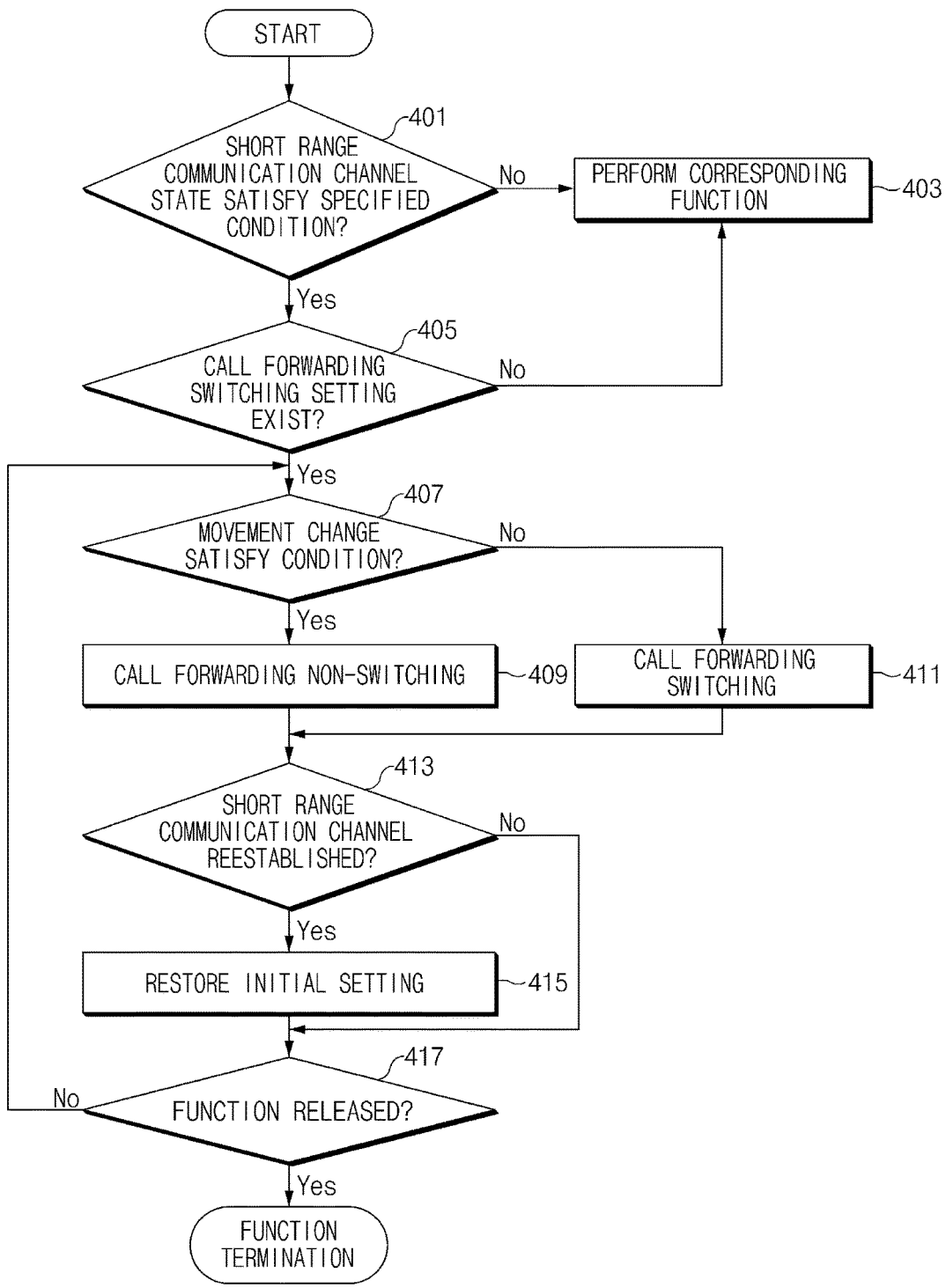
FIG. 4 is a flowchart illustrating an electronic device operating method relating to a communication service operation according to various embodiments of the present disclosure.

FIG. 4 is a flowchart illustrating an electronic device operating method relating to a communication service operation according to various embodiments of the present disclosure.

Referring to FIG. 4, in the electronic device operating method, the call forwarding control module 160 (e.g., the call forwarding control module of the first electronic device 100a or the call forwarding control module of the second electronic device 100b) may check whether a short range communication channel state satisfies a specified condition in operation 401. For example, the call forwarding control module 160 may check whether a link-loss relating to a short range communication channel occurs. If the short range communication channel state does not satisfy the specified condition, the call forwarding control module 160 may control a function performance corresponding to a situation in operation 403. For example, the call forwarding control module 160 may process information exchange between electronic devices (e.g., the first electronic device 100a or the second electronic device 100b) establishing a short range communication channel corresponding to a short range communication channel maintenance. Alternatively, the call forwarding control module 160 may activate the sensor module 170 and share sensing information that the sensing module 170 collects.

If the short range communication channel state satisfies the specified condition, the call forwarding control module 160 may check whether there is a call forwarding switching setting in operation 405. If there is no call forwarding switching setting, the method branches into operation 403 to perform function processing corresponding to a specified condition satisfaction. For example, the call forwarding control module 160 may output alarm information on link-loss occurrence (e.g., output it to a display or an input/output interface of at least one of the first electronic device 100a and the second electronic device 100b). According to various embodiments of the present disclosure, a call forwarding switching function may be a function provided by default. In this case, an operation for checking whether there is a call forwarding switching setting may be omitted. Accordingly, if a specified condition is satisfied, the call forwarding control module 160 may skip operation 405 for checking whether there is a call forwarding switching setting and branch into operation 407.

If there is a call forwarding switching setting, the call forwarding control module 160 may check whether a movement change satisfies a specified condition in operation 407. If the movement change satisfies the specified condition, the call forwarding control module 160 may perform call forwarding non-switching in operation 409. In relation to this, the call forwarding control module 160 may collect sensing information before a link-loss occurs or may collect sensing information by activating the sensor module 170 when a link-loss occurs. When sensing information has a specified pattern (e.g., a sensor pattern occurring corresponding to a movement while a user carries or wears an electronic device) or value, the call forwarding control module 160 may determine that a user carries an electronic device. Accordingly, the call forwarding control module 160 may not perform call forwarding switching (e.g., process to allow the second electronic device 100b to receive a call) in order to allow an electronic device (e.g., the first electronic device 100a) carried by a user to receive a call.

If the movement change does not satisfy the specified condition, the call forwarding control module 160 may perform call forwarding switching in operation 411. For example, when sensing information corresponding to a situation in which there is no movement change is collected, the call forwarding control module 160 may determine that an electronic device (e.g., the first electronic device 100a) is not carried and is stored in a specific location. In this case, the call forwarding control module 160 may process call forwarding switching to allow a call that is to be received by the first electronic device 100a to be received by the second electronic device 100b. In relation to this, the call forwarding control module 160 may provide setting information relating to call forwarding switching to the communication service device 300.

Additionally or alternatively, the call forwarding control module 160 may check whether a short range communication channel re-establishment occurs in operation 413. In relation to this, the call forwarding control module 160 may perform surrounding search in a specified period, or in real time or may have a state of receiving a short range communication channel related signal transmitted from another electronic device.

When a short range communication channel is re-established, the call forwarding control module 160 may process initial setting restoration in operation 415. During this operation, when call forwarding is switched by a link-loss, the call forwarding control module 160 may cancel call forwarding switching. According to various embodiments of the present disclosure, the call forwarding control module 160 may output a pop-up window for asking whether to restore an initial setting corresponding to a short range communication channel re-establishment. Additionally, the call forwarding control module 160 may process initial setting restoration corresponding to a user selection. If there is no short range communication channel re-establishment, the call forwarding control module 160 may skip operation 415.

In operation 417, the call forwarding control module 160 may check whether a call forwarding switching related function is released corresponding to a short range communication channel operation. If there is no function release related event, the call forwarding control module 160 may branch into operation 407 and perform subsequent operations again. According to various embodiments of the present disclosure, when a normal release of a short range communication channel occurs (e.g., disconnected corresponding to a user input or predefined scheduled information), the call forwarding control module 160 may release a call forwarding switching function. During this operation, the call forwarding control module 160 may process a call reception setting of the first electronic device 100a or the second electronic device 100b based on call forwarding related setting information regardless of a short range communication channel operation.

Figure 5:
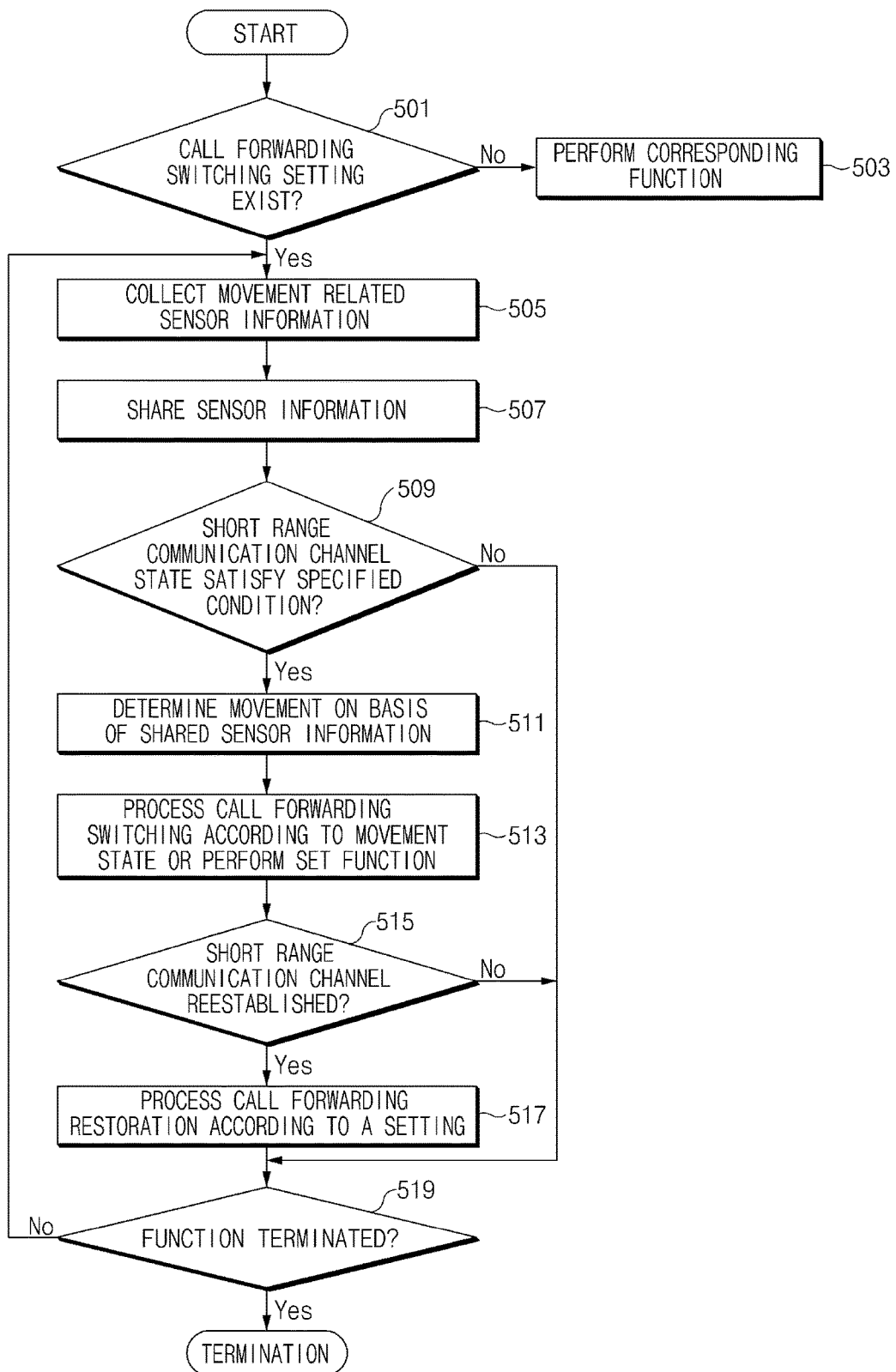
FIG. 5 is a flowchart illustrating an information sharing based electronic device operating method relating to a communication service operation according to various embodiments of the present disclosure.

FIG. 5 is a flowchart illustrating an information sharing based electronic device operating method relating to a communication service operation according to various embodiments of the present disclosure.

Referring to FIG. 5, in relation to an information-sharing based electronic device operating method, the call forwarding control module 160 may check whether there is a call forwarding switching setting in operation 501. If there is no call forwarding switching setting, the call forwarding control module 160 may process a function corresponding to an input event type or a scheduled job in operation 503. In relation to the above operation, once a short range communication channel is established, the call forwarding control module 160 may check whether there is a call forwarding switching setting.

If there is a call forwarding switching setting, the call forwarding control module 160 may collect movement related sensing information in operation 505. In relation to this, the call forwarding control module 160 may activate the sensor module 170 including at least one sensor relating to a movement analysis. For example, the call forwarding control module 160 may activate a motion sensor (e.g., an acceleration sensor, a gyro sensor, an angular velocity sensor, a geomagnetic sensor, and so on) and may collect sensing information according thereto.

In operation 507, the call forwarding control module 160 may perform sensing information sharing (e.g., sharing of an acceleration sensing value or a gyro sensing value). For example, the call forwarding control module 160 of the first electronic device 100a (or the second electronic device 100b) may transmit sensing information obtained in a predetermined period or in real time to the second electronic device 100b (or the first electronic device 100a). According to various embodiments of the present disclosure, when a wireless environment value (e.g., the intensity of a wireless reception signal) of a short range communication channel is less than a specified size, the call forwarding control module 160 may obtain sensing information. Alternatively, according to various embodiments of the present disclosure, when a wireless environment value (e.g., the intensity of a wireless reception signal) of a short range communication channel is less than a specified size, the call forwarding control module 160 may share the obtained sensing information. During the information sharing operation, the call forwarding control module 160 may determine whether there is a movement (e.g., if there is a movement, "1" and if there is no movement, "0") based on the obtained sensing information.

In operation 509, the call forwarding control module 160 may check whether a short range communication channel state satisfies a specified condition. If the short range communication channel state satisfies the specified condition, in operation 511, the call forwarding control module 160 may perform a shared sensing information based movement determination. For example, the call forwarding control module 160 may check whether the sensing information has a value of more than a specified size. According to various embodiments of the present disclosure, during the information sharing operation, when a value indicating whether there is a movement is shared in replacement of the sensing information, operation 511 may be omitted.

In operation 513, the call forwarding control module 160 may process call forwarding switching corresponding to a movement state or process a set function performance. For example, when a movement state of the first electronic device 100a (or the second electronic device 100b) is more than a specified value, the call forwarding control module 160 may allow a call of the first electronic device 100a and the second electronic device 100b to be received by the first electronic device 100a (or the second electronic device 100b). According to various embodiments of the present disclosure, when movement state values of the first electronic device 100a and the second electronic device 100b are all more or less than a specified value, the call forwarding control module 160 may output a specified alarm (e.g., an error message). Then, the call forwarding control module 160 may allow a specified electronic device to receive a call corresponding to a value set as default. For example, the call forwarding control module 160 may allow the first electronic device 100a (or the second electronic device 100b) in correspondence to an error occurrence corresponding to a setting.

Additionally or alternatively, the call forwarding control module 160 may check whether a short range communication channel is re-established in operation 515. In relation to this, the call forwarding control module 160 may perform surrounding search in a predetermined period or may maintain a short range wireless signal reception state. When a short range communication channel is re-established, the call forwarding control module 160 may process call forwarding restoration corresponding to a setting in operation 517.

In operation 519, the call forwarding control module 160 may check whether a function is terminated. If there is no function termination related event, the call forwarding control module 160 may branch into operation 505 and perform subsequent operations again. If the function termination related event occurs, the call forwarding control module 160 may release the call forwarding switching function.

If the short range communication channel state does not satisfy the specified condition in operation 509, for example, a short range communication channel is maintained, the call forwarding control module 160 may skip the following operations, for example, operations 511, 513, 515, and 517. Additionally, if a short range communication channel is not re-establishment in operation 515, the call forwarding control module 160 may skip operation 517.

Figure 6:
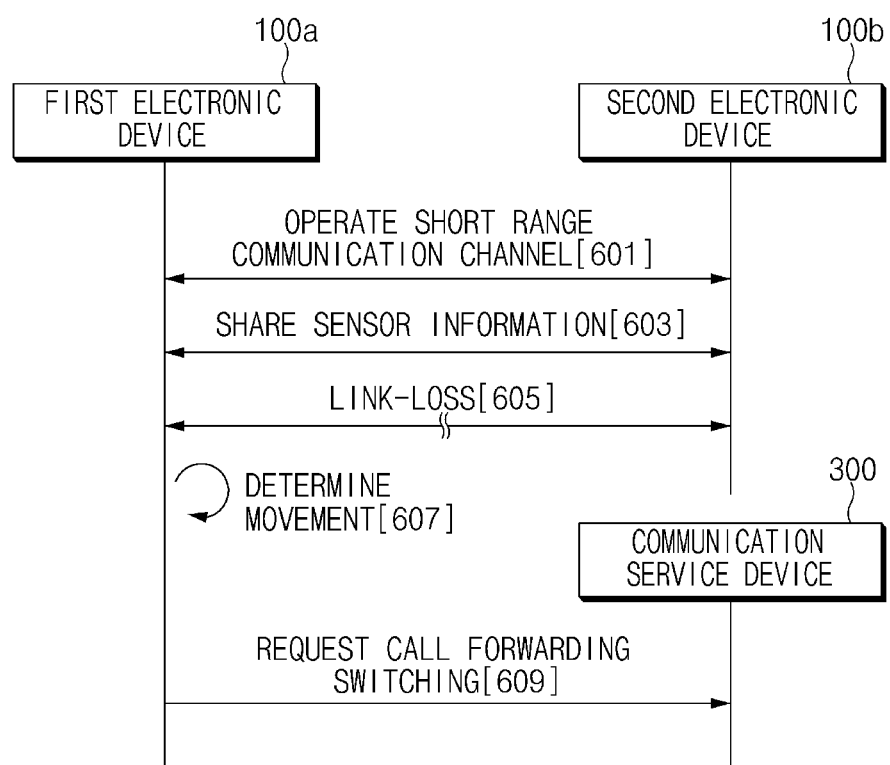
FIG. 6 is a view illustrating a communication service operation related signal flow according to various embodiments of the present disclosure.

FIG. 6 is a view illustrating a communication service operation related signal flow according to various embodiments of the present disclosure.

Referring to FIG. 6, in relation to a communication service operation, the first electronic device 100a and the second electronic device 100b may perform a short range communication channel operation in operation 601. In relation to this, at least one of the first electronic device 100a and the second electronic device 100b may search for the other side device and establish a short range communication channel in corresponded to a user input or scheduled information.

In operation 603, the first electronic device 100a and the second electronic device 100b may share sensing information. In relation to this, at least one of the first electronic device 100a and the second electronic device 100b may activate the sensor module 170 and may transmit obtained sensing information to the other side electric device. During this operation, corresponding to a setting, the first electronic device 100a may transmit sensing information to the second electronic device 100b or the second electronic device 100b may transmit sensing information to the first electronic device 100a. Alternatively, the first electronic device 100a and the second electronic device 100b may transmit/receive sensing information therebetween. The first electronic device 100a in FIG. 6 may collect its own sensing information or may receive sensing information from the second electronic device 100b. According to various embodiments of the present disclosure, each of the first electronic device 100a and the second electronic device 100b may collect sensing information and may determine whether a movement state is greater or less than a specified value. Correspondingly, the first electronic device 100a and the second electronic device 100b may share a movement state value (e.g., as a value indicating whether a movement state is greater or less than a specified value, 1, 0, or a given specific value) in replacement of the sensing information sharing.

In operation 603, a link-loss may occur in the first electronic device 100a and the second electronic device 100b. For example, when the first electronic device 100a and the second electronic device 100b are disposed at positions spaced more than a specified distance, a link-loss may occur in the first electronic device 100a and the second electronic device 100b. Alternatively, when the first electronic device 100a and the second electronic device 100b are disposed at positions where communication is unavailable based on the second communication module 112, a link-loss may occur.

In operation 607, the first electronic device 100a may perform a movement determination. For example, the first electronic device 100a may determine whether there is a movement of more than a specified movement state based on sensing information collected. Alternatively, the first electronic device 100a may determine whether the second electronic device 100b has a movement of more than a specified movement state based on sensing information provided from the second electronic device 100b. According to various embodiments of the present disclosure, when the first electronic device 100a and the second electronic device 100b share a movement state value in operation 603, operation 607 may be optional.

When a movement state of the first electronic device 100a is less than a specified value (e.g., the first electronic device 100a does not move) or a movement state of the second electronic device 100b is greater than a specified value (e.g., the second electronic device 100b moves), the first electronic device 100a may request a call forwarding switching in operation 609. For example, the first electronic device 100a may provide, to the communication service device 300, setting information set for allowing the second electronic device 100b to receive a call incoming to first electronic device 100a. Accordingly, when a call that is to be transmitted to the first electronic device 100a is received, the communication service device 300 may deliver the call to the second electronic device 100b.

According to various embodiments of the present disclosure, when a movement state of the first electronic device 100a is greater than a specified value, or a movement state of the second electronic device 100b is less than a specified value, the first electronic device 100a does not request call forwarding switching and performs processing to receive a call by itself.

Figure 7:
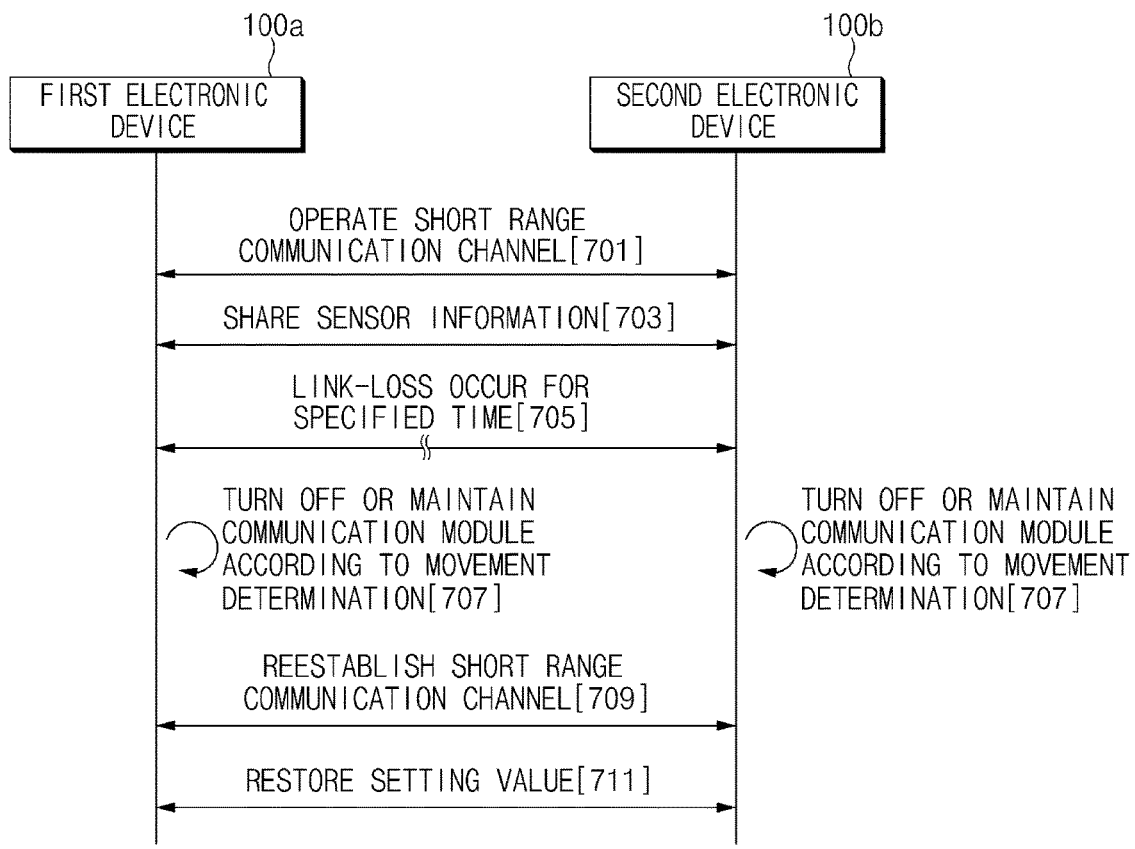
FIG. 7 is a view illustrating a communication service operation related information sharing based signal flow according to various embodiments of the present disclosure.

FIG. 7 is a view illustrating a communication service operation related information sharing based signal flow according to various embodiments of the present disclosure.

Referring to FIG. 7, in relation to a communication service operation, the first electronic device 100a and the second electronic device 100b may perform a short range communication channel operation in operation 701. In operation 703, the first electronic device 100a and the second electronic device 100b may share sensing information.

In operation 705, a link-loss may occur for a specified time in the first electronic device 100a and the second electronic device 100b. During this operation, the first electronic device 100a or the second electronic device 100b may operate a counter after a link-loss occurs. During this operation, if a link-loss is maintained after the counter is expired, the first electronic device 100a or the second electronic device 100b may process the next operation. If a short range communication channel is re-established before the counter is expired, the first electronic device 100a or the second electronic device 100b may return to operation 701 and them process the subsequent operations again.

When a link-loss is maintained for a specified time, the first electronic device 100a may turn off or maintain a communication module corresponding to a movement determination in operation 707. Alternatively, the second electronic device 100b may maintain or turn off a communication module corresponding to a movement determination in operation 707. According to various embodiments of the present disclosure, when a link-loss occurs for a specified time, the first electronic device 100a may perform a movement determination of itself or the second electronic device 100b based on shared sensing information. When a movement state of the first electronic device 100*a* is less than a specified value (e.g., there is no movement) or a movement state of the second electronic device 100*b* is greater than a specified value, the first electronic device 100*a* may turn off the first communication module of the first electronic device 100*a*. In addition, the first electronic device 100*a* may provide setting information to the communication service device 300 to allow the second electronic device 100*b* to receive a call. When a movement state of the first electronic device 100*a* is greater than a specified value (e.g., there is a movement of greater than a specified size) or a movement state of the second electronic device 100*b* is less than a specified value, the first electronic device 100*a* may turn on the first communication module of the first electronic device 100*a*.

According to various embodiments of the present disclosure, when a link-loss occurs for a specified time, the second electronic device 100*b* may perform a movement determination of itself or the first electronic device 100*a* based on shared sensing information. When a movement state of the second electronic device 100*b* is less than a specified value (e.g., there is no movement) or a movement state of the first electronic device 100*a* is greater than a specified value, the second electronic device 100*b* may turn off the first communication module of the second electronic device 100*b*. In addition, the second electronic device 100*b* may provide setting information to the communication service device 300 to allow the first electronic device 100*a* to receive a call. When a movement state of the second electronic device 100*b* is greater than a specified value (e.g., there is a movement of greater than a specified size) or a movement state of the first electronic device 100*a* is less than a specified value, the second electronic device 100*b* may turn on the first communication module of the second electronic device 100*b*.

Additionally or alternatively, the first electronic device 100*a* and the second electronic device 100*b* may re-establish a short range communication channel in operation 709. For example, when a separation distance between the first electronic device 100*a* and the second electronic device 100*b* is reduced to within a communication available predetermined distance, or the first electronic device 100*a* or the second electronic device 100*b* is moved to a communication available position, a short range communication channel may be re-established. Accordingly, the first electronic device 100*a* and the second electronic device 100*b* may restore a setting value in relation to call forwarding in operation 711. According to various embodiments of the present disclosure, the first electronic device 100*a* and the second electronic device 100*b* may check whether a specified time elapses after the short range communication channel re-establishment. When a specified time elapses, the first electronic device 100*a* and the second electronic device 100*b* may process a call forwarding setting value restoration corresponding to the short range communication channel re-establishment.

As mentioned above, according to various embodiments of the present disclosure, a communication service operating method may include detecting an operation change of a short range communication or wired communication based communication channel; and in correspondence to the communication channel operation change, based on at least one of a movement of an electronic device itself and a movement of another electronic device that is connected through the a communication module or has a connection history, performing processing to allow at least one of the electronic device and the other electronic device to receive a call signal that is to be received from a communication service device.

According to various embodiments of the present disclosure, the performing of the processing may include: collecting sensing information from a sensor module; determining a movement state of the electronic device itself based on the sensing information; and when the movement state of the electronic device itself is less than a specified value, performing processing to allow the other electronic device to receive the call signal.

According to various embodiments of the present disclosure, the performing of the processing may include: collecting sensing information from a sensor module; determining a movement state of the electronic device itself based on the sensing information; and when the movement state of the electronic device itself is equal to or greater than a specified value, performing processing to allow the electronic device itself to receive the call signal.

According to various embodiments of the present disclosure, the performing of the processing may include: determining a movement state of the other electronic device based on sensing information received from the other electronic device or receiving a movement state value from the other electronic device; and when the movement state of the other electronic device is less than a specified value, performing processing to allow the electronic device itself to receive the call signal.

According to various embodiments of the present disclosure, the performing of the processing may include: determining a movement state of the other electronic device based on sensing information received from the other electronic device or receiving a movement state value of the other electronic device; and when the movement state of the other electronic device is equal to or greater than a specified value, performs processing to allow the other electronic device to receive the call signal.

According to various embodiments of the present disclosure, the method may further include processing a reception path setting of the call signal corresponding to the movement determination when a link-loss of the short range communication occurs.

According to various embodiments of the present disclosure, the method may further include performing a control to restore a switched call forwarding state to a previous state when the link is reconnected.

According to various embodiments of the present disclosure, the method may further include outputting a call forwarding switching or call forwarding non-switching selection related item.

According to various embodiments of the present disclosure, the method may further include performing a control to turn off the first communication module when call forwarding is switched.

According to various embodiments of the present disclosure, the method may further include providing setting information relating to call forwarding switching to a communication service device relating to the first communication module.

Figure 8:
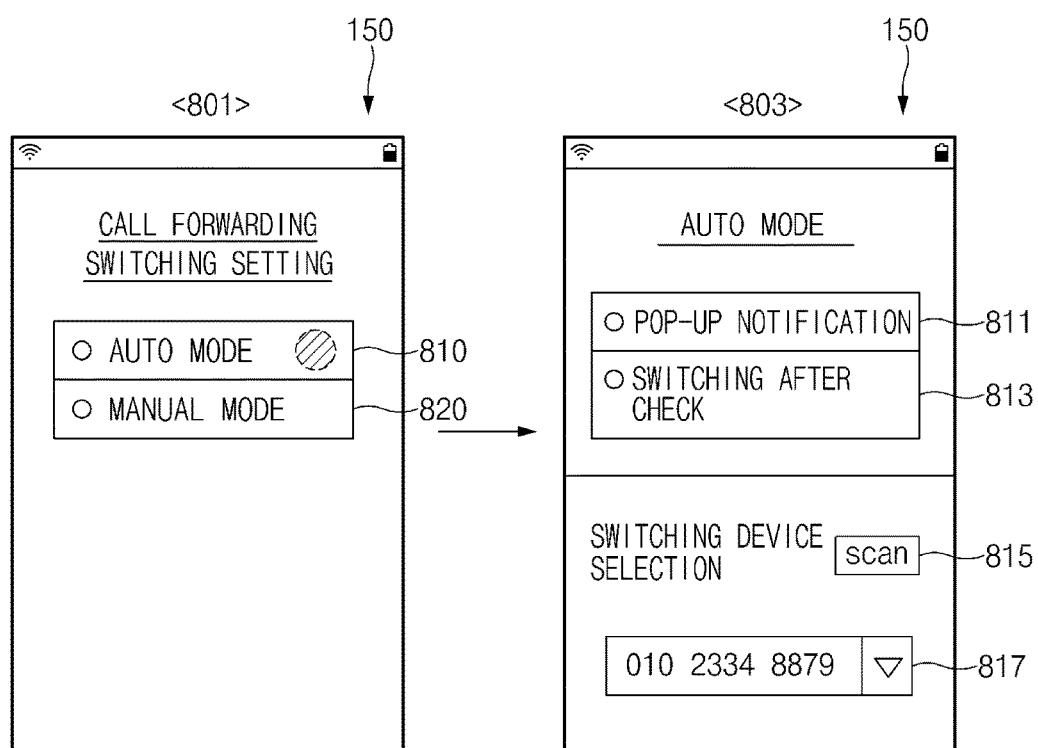
FIG. 8 is a view illustrating a screen interface relating to a call forwarding setting mode according to various embodiments of the present disclosure.

FIG. 8 is a view illustrating a screen interface relating to a call forwarding setting mode according to various embodiments of the present disclosure.

Referring to FIG. 8, in correspondence to a user input, a display 150 (e.g., a display of the first electronic device 100*a* or a display of the second electronic device 100*b*) may output a call forwarding switching setting screen as shown in a screen 801. The call forwarding switching screen, for example, may include auto mode item 810 and a manual mode item 820. When the manual mode item 820 is selected, the electronic device 100 may perform call forwarding switching corresponding to a user input regardless of a short range communication channel operation.

When the auto mode item 810 is selected, the display 150 may output or display an auto mode setting screen as shown in a screen 803. The auto mode setting screen, for example, may include a pop-up notification item 811 and a switching item after check 813. When the pop-up notification item 811 is selected, if call forwarding switching occurs, the electronic device 100 may output occurred information as in a pop-up notification form. According to various embodiments of the present disclosure, if the pop-up notification item 811 is not selected, the electronic device 100 may process call forwarding auto switching corresponding to a short range communication channel operation environment based on background processing and corresponding to whether there is a movement. When the switching item after check 813 is selected, the electronic device 100 may output a check item at the time that call forwarding switching is requested. When a user check input occurs, the electronic device 100 may process call forwarding switching.

According to various embodiments of the present disclosure, an auto mode setting screen may include a switching device selection area. The switching device selection area, for example, a search item 814 and a search device item 817. Once the search item 815 is selected, peripheral device search may be performed. The search device item 817 may show a found device item or a device item having a previous history corresponding to a selection of the search item 815. When a specific device item is selected, call forwarding switching may be set to a corresponding device item based on a change of a short range communication channel operation and a movement determination.

According to various embodiments of the present disclosure, the first electronic device 100a in a smartphone form may support a call forwarding setting screen of the second electronic device 100b in a wearable electronic device form. For example, the first electronic device 100a may provide a screen and a program manager for performing a call forwarding setting of the second electronic device 100b. Accordingly, a user may select or change an electronic device to which a call of the second electronic device 100b is to be forwarded.

Figure 9:
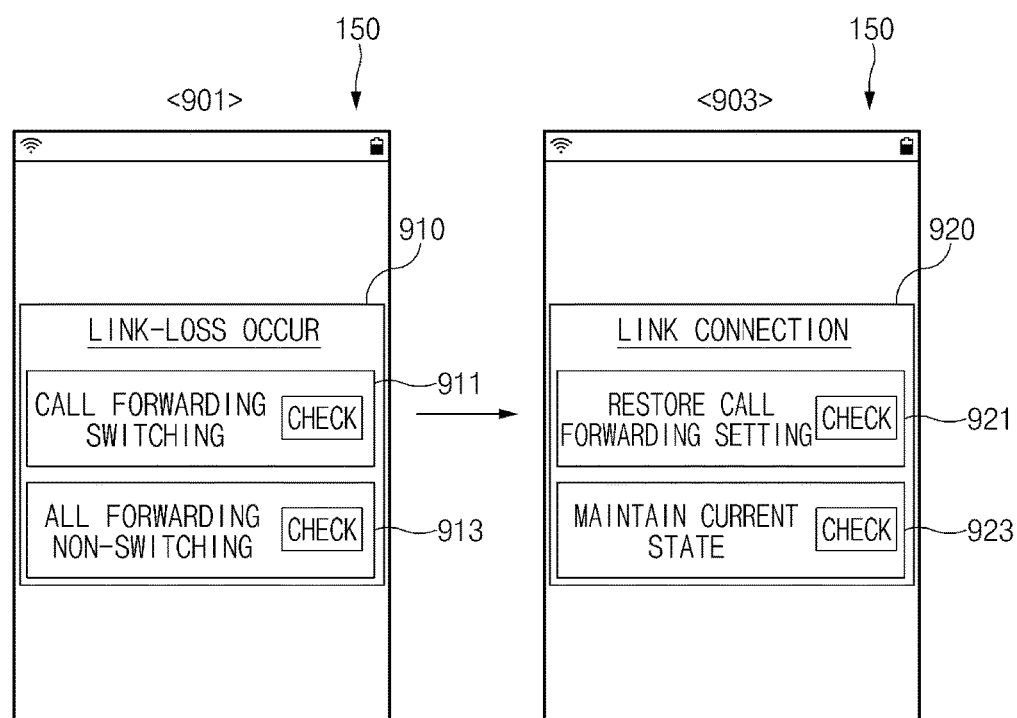
FIG. 9 is a view illustrating a screen interface relating to a message output according to a call forwarding setting according to various embodiments of the present disclosure.

FIG. 9 is a view illustrating a screen interface relating to a message output corresponding to a call forwarding setting according to various embodiments of the present disclosure.

Referring to FIG. 9, the display 150 may output or display information on a short range communication channel operation change. For example, the display 150, as shown in a screen 901, may output or display a pop-up window 910 corresponding to a short range communication channel operation change. The pop-up window 910 may include or display information on a short range communication channel operation change, for example, "link-loss occurrence". According to various embodiments of the present disclosure, the pop-up window 910 may include a call forwarding switching check item 911 and a call forwarding non-switching check item 913 in correspondence to a link-loss occurrence. The output of the pop-up window 910 may be performed when the switching item after check 813 is selected from the screen 803. When the call forwarding switching check item 911 is selected, electronic devices (e.g., at least one of the first electronic device 100a and the second electronic device 100b) may process call forwarding switching corresponding to setting information in correspondence to a link-loss occurrence. In relation to this, the electronic devices may allow an electronic device having a movement (e.g., the first electronic device 100a or the second electronic device 100b) to receive a call. When the call forwarding non-switching check item 913 is selected, electronic devices may maintain a previous call forwarding setting state.

According to various embodiments of the present disclosure, a link may be connected again in electronic devices where a link-loss of a short range communication channel occurs. For example, as a separation distance between the first electronic device 100a and the second electronic device 100b is changed into a communicable separation distance, a link may be connected. Correspondingly, the display 150 may output a pop-up window 920 corresponding to a link connection. The pop-up window 920, for example, may include a call forwarding setting restoration check item 921 and a current state maintenance check item 923. When the call forwarding setting restoration check item 921 is selected, electronic devices may be restored to have a call forwarding state before link-loss occurrence. When the current state maintenance check item 923 is selected, electronic devices may maintain a call forwarding state switched by a link-loss regardless of a link connection. In the above operation, electronic devices may automatically switch call forwarding without outputting pop-up windows in correspondence to an auto mode setting.

According to various embodiments of the present disclosure, although it is described above that after a short communication channel establishment between the first electronic device 100a and the second electronic device 100b, call forwarding switching is processed in correspondence to a link-loss occurrence and a movement occurrence, various embodiments of the present disclosure are not limited thereto. For example, when a short range communication channel is established, the first electronic device 100a and the second electronic device 100b may check whether there is a movement and may process call forwarding switching in correspondence to a movement occurrence. According to an embodiment of the present disclosure, while a short range communication channel is established between the first electronic device 100a and the second electronic device 100b, if the first electronic device 100a (or the second electronic device 100b) is moved more than a specified movement state, the second electronic device 100b (or the first electronic device 100a) may allow a call that is to be received by the second electronic device 100b to be received by the first electronic device 100a.

In one case to which the above embodiment is applied, as a user operates the first electronic device 100a and the second electronic device 100b at the same time (e.g., operates them in an establishment state of a short range communication channel), the user may go out or exercise (e.g., a link-loss with the first electronic device 100a occurs) while wearing (or carrying) only the second electronic device 100b. In this case, according to various embodiments of the present disclosure, it is possible to perform processing to allow the second electronic device 100b that a user carries (or having a movement of a specified size) to receive a call of the first electronic device 100a and the second electronic device 100b.

Additionally, as wearing the second electronic device 100b and going out, a user may arrive at an area adjacent to a location where the first electronic device 100a is disposed (e.g., a short range communication available distance between the first electronic device 100a and the second electronic device 100b). In this case, according to various embodiments of the present disclosure, by determining a movement occurrence, it is possible to perform processing to allow a specific electronic device to automatically receive a call of two electronic devices. For example, after returning home in a state of wearing the second electronic device 100*b*, a user may take off the second electronic device 100*b* and may move in the house in a state of carrying the first electronic device 100*a*. In this case, according to various embodiments of the present disclosure, as a call to be received by the second electronic device 100*b* is delivered to the first electronic device 100*a*, inconvenience corresponding to a call reception may be reduced. Herein, a call that is to be received by the first electronic device 100*a* may be automatically received corresponding to a movement check of the first electronic device 100*a*.

Figure 10:
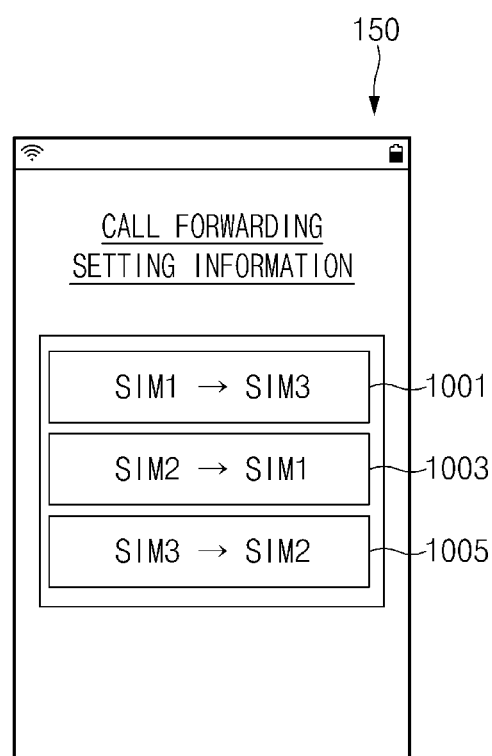
FIG. 10 is a view illustrating a call forwarding setting screen according to various embodiments of the present disclosure.

FIG. 10 is a view illustrating a call forwarding setting screen according to various embodiments of the present disclosure.

Referring to FIG. 10, an electronic device, for example, the first electronic device 100*a*, may provide a screen for selecting a call forwarding device or subscriber identification module (SIM). According to various embodiments of the present disclosure, the first electronic device 100*a* may be a device including multiple SIMs (e.g., SIM1 and SIM2). Additionally, the second electronic device 100*b* may be a device including one SIM (e.g., SIM3). According to various embodiments of the present disclosure, the second electronic device 100*b* is a companion device of the first electronic device 100*a*, and the first electronic device 100*a* may provide a call forwarding setting of the second electronic device 100*b*.

For example, the display 150 of the first electronic device 100*a*, as shown in the drawing, may provide a call forwarding setting information screen. The call forwarding setting information screen, for example, may display call forwarding information of the multi SIMs SIM1 and SIM2 included in the first electronic device 100*a* and the SIM SIM3 included in the second electronic device 100*b*. For example, as shown in an item 1001, the forwarding of the first SIM SIM1 may be set to the third SIM SIM3. As shown in an item 1003, the forwarding of the second SIM SIM2 may be set to the first SIM SIM1. As shown in an item 1005, the forwarding of the third SIM SIM3 may be set to the second SIM SIM2. The above setting may be changed in correspondence to a user manipulation.

The call forwarding setting information screen may be the setting information 131 stored in the memory 130. The setting information 131 set in the call forwarding setting information screen may be provided to the communication service device 300 in correspondence to a short range communication channel operation change and a movement determination. Alternatively, according to various embodiments of the present disclosure, after the setting information 131 registered in the call forwarding setting information screen is registered in the communication service device 300, the setting information 131 may be applied automatically in correspondence to whether the first communication module 111 is turned on/off. In relation to this, when a specific SIM related communication module operation is stopped (or is turned off or an access of a corresponding SIM is blocked), the communication service device 300 may check the setting information 131 and may deliver a call signal to be delivered to a corresponding SIM to a device having another SIM.

Figure 11:
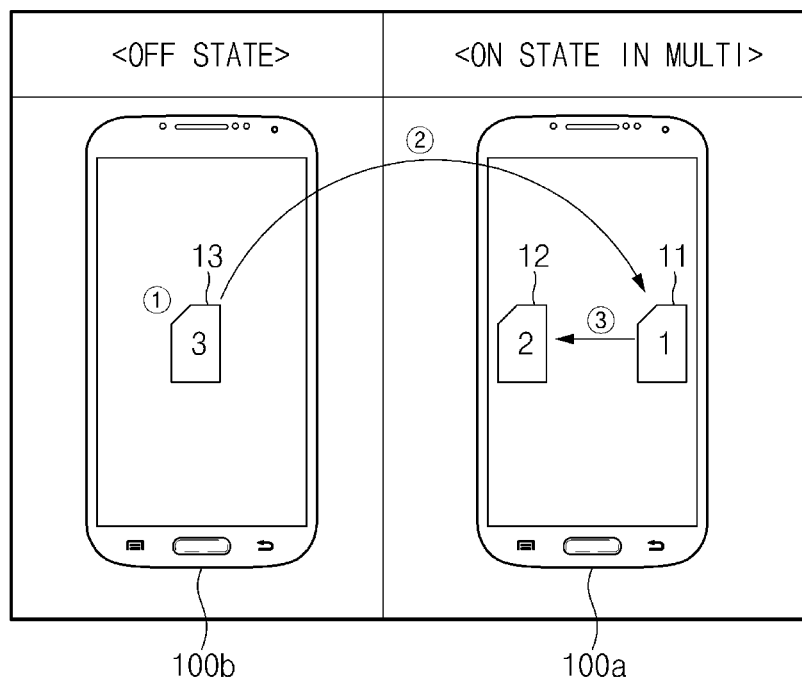
FIG. 11 is a view illustrating a call forwarding operation relating to an electronic device according to various embodiments of the present disclosure.

FIG. 11 is a view illustrating a call forwarding operation relating to a second electronic device 100*b* according to various embodiments of the present disclosure.

Referring to FIG. 11, a first electronic device 100*a* may be a device including a first SIM 11 and a second SIM 12 and the second electronic device 100*b* may be a device including a third SIM 13. According to an embodiment of the present disclosure, in relation to call forwarding switching, the first electronic device 100*a* and the second electronic device 100*b* may register the call forwarding setting information described with FIG. 10 in the communication service device 300. Accordingly, when a call to be delivered to the first electronic device 100*a* or the second electronic device 100*b* occurs, the communication service device 300 may process call signal delivery corresponding to call forwarding setting information.

In correspondence to a short range communication channel operation change with the first electronic device 100*a* (e.g., a link-loss occurrence) and a movement determination (e.g., the first electronic device 100*a* has a movement state of more than a specified size), the second electronic device 100*b* may set call forwarding to the first SIM 11 of the first electronic device 100*a*. Additionally, the second electronic device 100*b* may turn off the first communication module 111 corresponding to a call forwarding switching setting or corresponding to a user input.

In the above-mentioned state, when a call signal relating to the third SIM 13 of the second electronic device 100*b* occurs, the communication service device 300 may check call forwarding setting information provided from the second electronic device 100*b*. Alternatively, in relation to a call signal delivery, the communication service device 300 may check a state of the second electronic device 100*b* and when the first communication module of the second electronic device 100*b* is turned off, may check call forwarding setting information. The communication service device 300 may check a setting for delivering a call signal to the first SIM 11 of the first electronic device 100*a* through call forwarding setting information. Accordingly, the communication service device 300 may deliver a call signal relating to the third SIM 13 to the first SIM 11.

According to various embodiments of the present disclosure, the first electronic device 100*a* may be a device including a multi SIM (e.g., SIM1 and SIM2). When the second SIM 12 is in operation, the communication service device 300 may regard the first SIM 11 as in a turn off state. The communication service device 300 may check call forwarding setting information that the first electronic device 100*a* registers and may check a setting for delivering a call signal to be delivered to the first SIM 11 to the second SIM 12. Accordingly, the communication service device 300 may deliver a call signal to be delivered to the first SIM 11 to the second SIM 12. When a call signal is received based on the second SIM 12, the first electronic device 100*a* may have a call standby state corresponding to a state during a call function performance. According to various embodiments of the present disclosure, the first electronic device 100*a* may output information on a state of receiving a call signal relating to the third SIM 13 by the second SIM 12 through the first SIM 11. In relation to this, the communication service device 300 may provide information on a delivery root of a call signal to the first electronic device 100*a*. In the above-mentioned description, when the second SIM 12 is in a non-operational state, a call signal relating to the third SIM 13 may be delivered through the first SIM 11.

Figure 12:
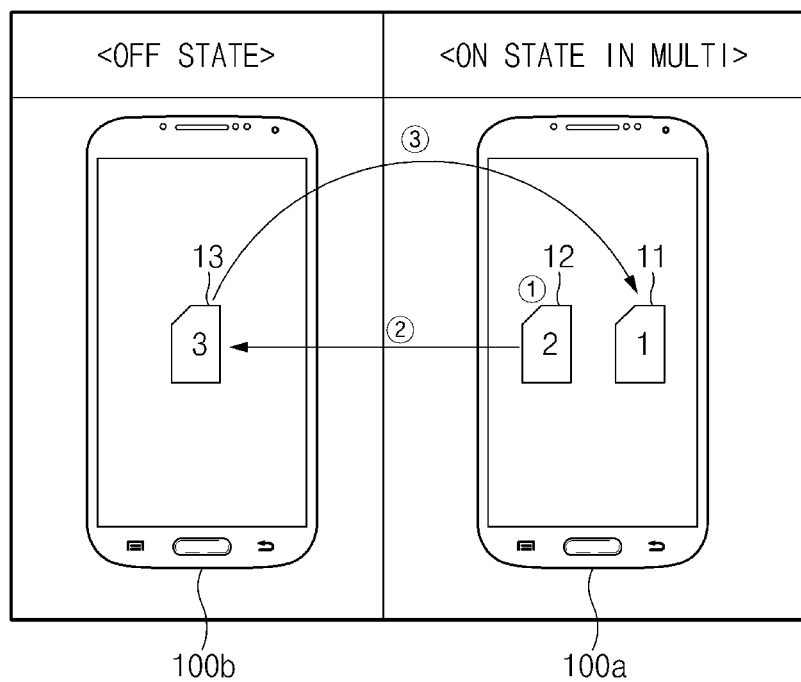
FIG. 12 is a view illustrating a second SIM related call forwarding operation of a first electronic device according to various embodiments of the present disclosure.

FIG. 12 is a view illustrating a second SIM related call forwarding operation of a first electronic device 100*a* according to various embodiments of the present disclosure.

Referring to FIG. 12, according to an operation change (e.g., a link-loss occurrence) of a short range communication channel and a movement determination (e.g., the first electronic device 100*a* has a movement state of more than a specified size or a movement state of the second electronic device 100*b* is less than a specified value), the first electronic device 100*a* and the second electronic device 100*b* may set the first communication module of the second electronic device 100*b* to be in a turn off state. The second electronic device 100*b* may provide call forwarding setting information to the communication service device 300 corresponding to the turn off of the first communication module. Alternatively, the second electronic device 100*b* may provide call forwarding setting information to the communication service device 300 at a predetermined timing (e.g., an initial or specified access timing of the communication service device 300) regardless of the turn off of the first communication module. The call forwarding setting information may be the call forwarding setting information described with FIG. 10.

According to various embodiments of the present disclosure, the first electronic device 100*a* may be in a state of operating a communication function based on the first SIM 11. When a communication function of the first SIM 11 operates in the first electronic device 100*a* having a multi SIM, the communication service device 300 may regard the second SIM 12 as in a turn off state. Accordingly, the communication service device 300 may deliver a call signal to be delivered to the second SIM 12 to the second electronic device 100*b* having the third SIM 13 corresponding to call forwarding setting information. During this operation, the communication service device 300 may check a state in which the third SIM 13 of the second electronic device 100*b* is in a non-operational state (e.g., a state in which the first communication module of the second electronic device 100*b* is turned off) and may deliver a call signal to be delivered to the third SIM 13 to the first SIM 11 corresponding to call forwarding setting information. Since the first SIM 11 is in an operational state, the first electronic device 100*a* may process a received call signal as in a call standby state.

Figure 13:
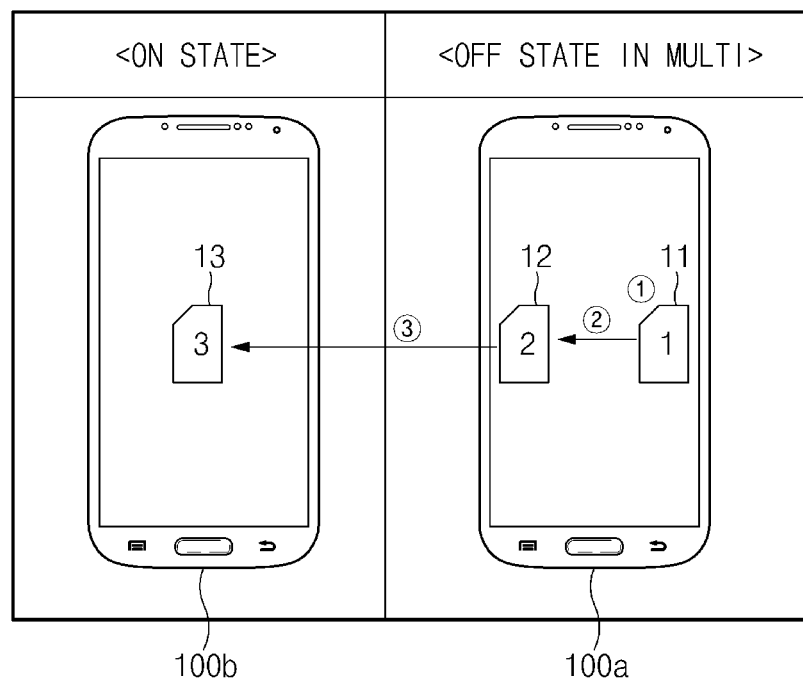
FIG. 13 is a view illustrating a first SIM related call forwarding operation of a first electronic device according to various embodiments of the present disclosure.

FIG. 13 is a view illustrating a first SIM related call forwarding operation of a first electronic device 100*a* according to various embodiments of the present disclosure.

Referring to FIG. 13, when a link-loss relating to a short range communication channel with the second electronic device 100*b* occurs, the first electronic device 100*a* may determine a movement and may be in a state of processing call forwarding switching to the second electronic device 100*b*. For example, when a link-loss occurs, the second electronic device 100*b* may have a movement state of more than a specified size. Accordingly, the first electronic device 100*a* may process a first communication module as in a turn off state. In correspondence to that the first communication module of the first electronic device 100*a* is changed into a turn off state, the first SIM 11 and the second SIM may have a non-operational state. The first electronic device 100*a* may provide call forwarding setting information when the first communication module is switched into a turn off state, or when accessing the communication service device 300 at an initial or specified timing. In the above-mentioned state, the communication service device 300 may receive a call signal relating to the first SIM 11 from an external electronic device. The communication service device 300 may check call forwarding setting information that the first electronic device 100*a* provides and a state of the first electronic device 100*a* (e.g., a state in which the first communication module is turned off), and may check a setting for delivering a call signal relating to the first SIM 11 to the second SIM 12. Additionally, the communication service device 300 may check a setting for delivering a call signal to be delivered to the second SIM 12 to the third SIM 13. Accordingly, the communication service device 300 may deliver a call signal to be delivered to the first SIM 11 to the third SIM 13 of the second electronic device 100*b*. According to various embodiments of the present disclosure, when receiving a call signal to be delivered to the second SIM 12 from an external electronic device, the communication service device 300 may deliver the call signal to the third SIM 13 in correspondence to a state in which the first communication module of the first electronic device 100*a* is turned off.

Figure 14:
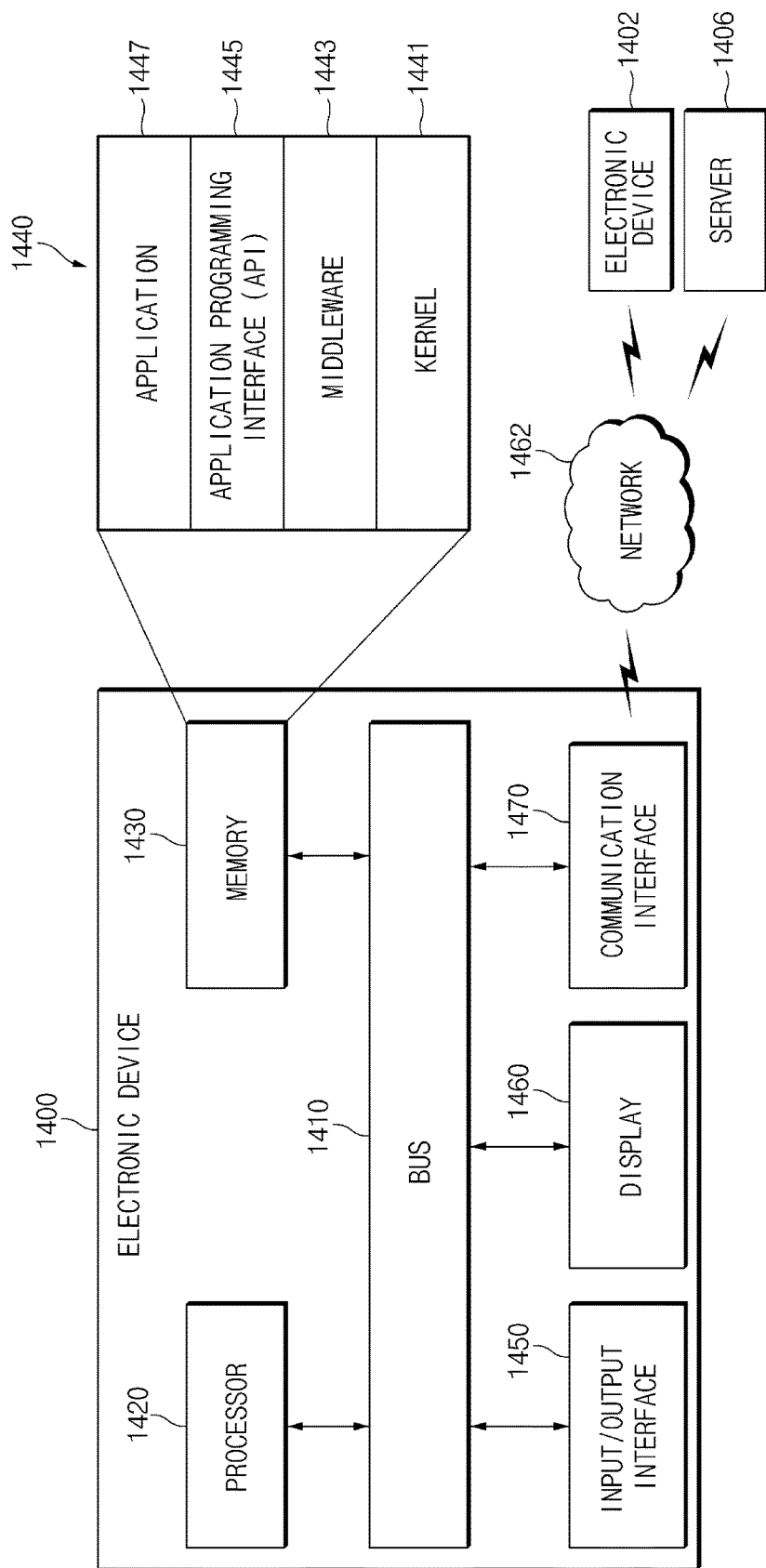
FIG. 14 is a view illustrating an electronic device related network environment according to various embodiments of the present disclosure.

FIG. 14 is a view illustrating an electronic device related network environment according to various embodiments of the present disclosure.

Referring to FIG. 14, an electronic device 1400 in a network environment is described according to various embodiments of the present disclosure. The electronic device 1400 may include a bus 1410, a processor 1420, a memory 1430, an input/output interface 1450, a display 1460, and a communication interface 1470. According to an embodiment of the present disclosure, the electronic device 1400 may omit at least one of the components or may additionally include a different component.

The bus 1410, for example, may include a circuit for connecting the components 1420 to 1470 to each other and delivering a communication (e.g., control message and/or data) between the components 1420 to 1470.

The processor 1420 (e.g., the processor 120 of FIG. 1) may include at least one of a central processing unit (CPU), an Application Processor (AP), and a communication processor (CP). The processor 1420, for example, may execute calculation or data processing for control and/or communication of at least one another component of the electronic device 1400.

The memory 1430 (e.g., the memory 130 of FIG. 1) may include volatile and/or nonvolatile memory. The memory 1430, for example, may store instructions or data relating to at least one another component of the electronic device 1400.

According to an embodiment of the present disclosure, the memory 1430 may store software and/or program 1440. The programs 1440 may include a kernel 1441, a middleware 1443, an application programming interface (API) 1445, and/or an application program (or an application) 1447. At least part of the kernel 1441, the middleware 1443, or the API 1445 may be called an operating system (OS).

The kernel 1441, for example, may control or manage system resources (e.g., the bus 1410, the processor 1420, the memory 1440, and so on) used for performing operations or functions implemented in other programs (e.g., the middleware 1443, the API 1445, or the application program 1447). Additionally, the kernel 1441 may provide an interface for controlling or managing system resources by accessing an individual component of the electronic device 1400 from the middleware 1443, the API 1445, or the application program 1447. According to various embodiments of the present disclosure, the kernel 1441 may provide an interface for control and management of system resources necessary for establishing a communication channel with the electronic device 1402.

The middleware 1443, for example, may serve as an intermediary role for exchanging data as the API 1445 or the application program 1447 communicates with the kernel 1441. Additionally, the middleware 1443 may process at least one job request received from the application program 1447 according to a priority. For example, the middleware 1443 may assign to at least one application program 1447 a priority for using a system resource (e.g., the bus 1410, the processor 1420, or the memory 1430) of the electronic device 1400. For example, the middleware 1443 may perform scheduling or load balancing on the at least one job request by processing the at least one job request according to the priority assigned to the at least one job request.

The API 1445, as an interface for allowing the application program 1447 to control a function provided from the kernel 1441 or the middleware 1443, may include at least one interface or function (e.g., an instruction) for file control, window control, image processing, or character control.

The input/output interface 1450 (e.g., the input/output interface 140 of FIG. 1) may serve as an interface for delivering instructions or data inputted from a user or another external device to another component(s) of the electronic device 1400. Additionally, the input/output interface 1450 may output instructions or data received from another component(s) of the electronic device 1400 to a user or another external device.

The display 1460 (e.g., the display 150 of FIG. 1) may include a liquid crystal display (LCD), a light emitting diode (LED) display, an organic light emitting diode (OLED) display, a microelectromechanical systems (MEMS) display, or an electronic paper display. The display 1460 may display various contents (e.g., text, image, video, icon, symbol, and so on) to a user. The display 1460 may include a touch screen, and for example, may receive a touch, gesture, proximity, or hovering input by using an electronic pen or a user's body part.

The communication interface 1470, for example, may set communication between the electronic device 1400 and an external device (e.g., the external electronic device 1402 or the server device 1406). For example, the communication interface 1470 may communicate with an external device (e.g., the external electronic device 1402 or the server device 1406) in connection to the network 1462 through wireless communication or wired communication.

The wireless communication may use at least one of LTE, LTE-A, CDMA, WCDMA, UMTS, WiBro, or GSM as a cellular communication protocol, for example. Additionally, the wireless communication, for example, may include at least one of WiFi, Bluetooth, near field communication (NFC), global positioning system (GPS), BLE, Near Field Magnetic Induction (NFMI), 2.4 G/4 GHz Ear to Ear (e2e) wireless communication methods. The wired communication, for example, may include at least one of universal serial bus (USB), high definition multimedia interface (HDMI), recommended standard 232 (RS-232), and plain old telephone service (POTS). The network 1462 may include telecommunications network, for example, at least one of computer network (e.g., LAN or WAN), internet, and telephone network.

The external electronic device 1402 may be the same or different type of the electronic device 1400. The server device 1406 may include a group of one or more servers. According to various embodiments of the present disclosure, all or part of operations executed on the electronic device 1400 may be executed on another one or more electronic devices (e.g., the electronic device 1402 or the server device 1406). According to an embodiment of the present disclosure, when the electronic device 1400 performs a certain function or service automatically or by a request, it may request at least part of a function relating thereto from another device (e.g., the electronic device 1402 or the server device 1406) instead of or in addition to executing the function or service by itself. The other electronic devices (e.g., the electronic device 1402 or the server device 1406) may execute the requested function or an additional function and may deliver an execution result to the electronic device 1400. The electronic device 1400 may provide the requested function or service as it is or by processing the received result additionally. For this, for example, cloud computing, distributed computing, or client-server computing technology may be used.

Figure 15:
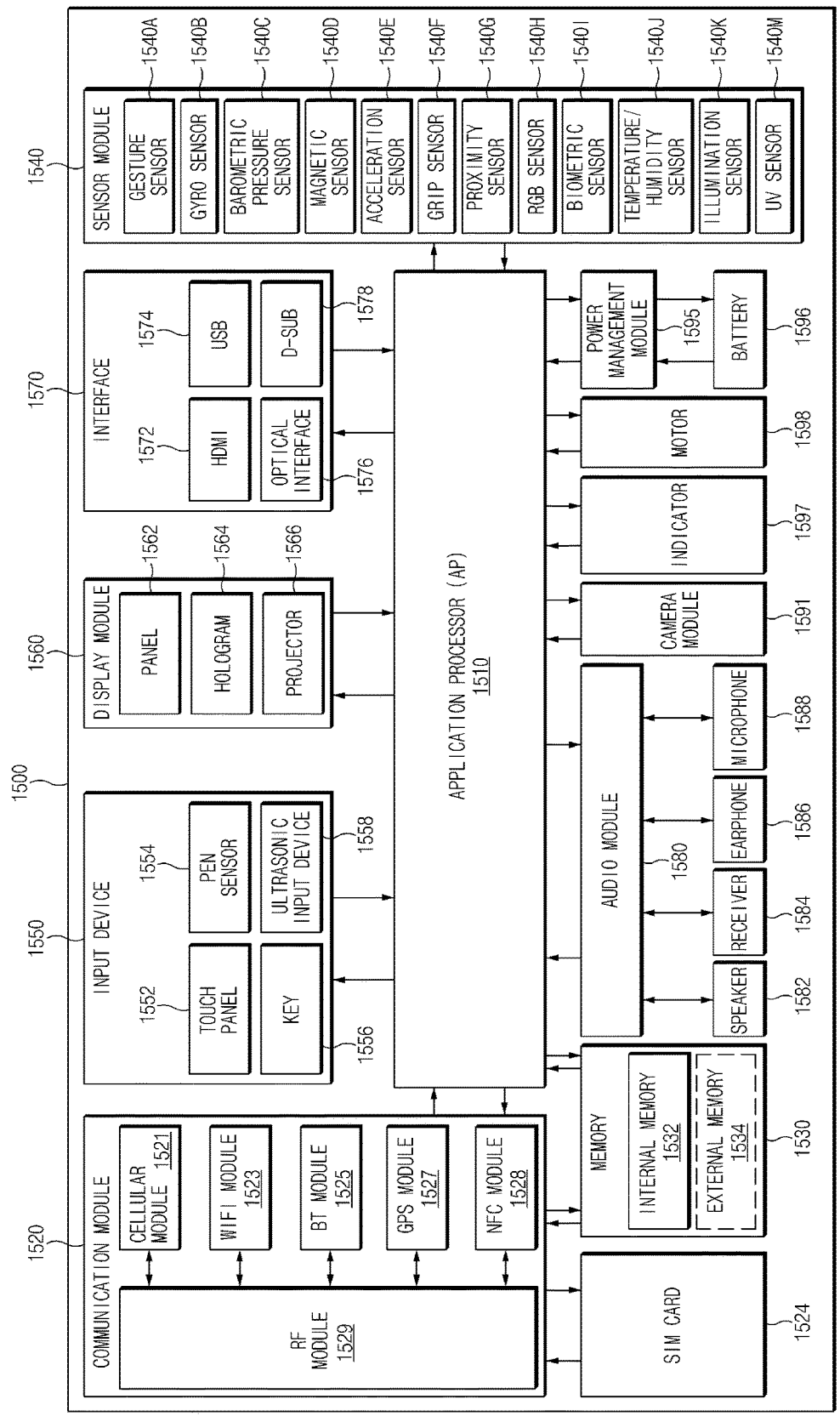
FIG. 15 is a block diagram illustrating an electronic device according to various embodiments of the present disclosure.

FIG. 15 is a block diagram illustrating an electronic device according to various embodiments of the present disclosure.

Referring to FIG. 15, the electronic device 1500, for example, may include all or part of at least one of the first electronic device 100a and the second electronic device 100b shown in FIG. 1 and the electronic device 100 shown in FIG. 2. The electronic device 1500 may include at least one processor (e.g., an application processor (AP) 1510), a communication module 1520, a subscriber identification module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may control a plurality of hardware or software components connected to the processor 1510 and also may perform various data processing and operations by executing an operating system or an application program. The processor 1510 may be implemented with a system on chip (SoC), for example. According to an embodiment of the present disclosure, the processor 1510 may further include a graphic processing unit (GPU) (not shown) and/or an image signal processor. The processor 1510 may include at least part (e.g., the cellular module 1521) of components shown in FIG. 15. The processor 1510 may load commands or data received from at least one of other components (e.g., nonvolatile memory) and process them and may store various data in a nonvolatile memory.

The communication module 1520 may have the same or similar configuration to at least one of the communication interfaces 170 and 1470, which are described with reference to FIGS. 2 and 14. The communication module 1520, for example, may include a cellular module 1521, a Wi-Fi module 1523, a Bluetooth module 1525, a GPS module 1527, an NFC module 1528, a radio frequency (RF) module 1529, a BLE module, an NFMI module, and an E2E Wireless module (not shown).

The cellular module 1521, for example, may provide voice call, video call, text service, or internet service through communication network. According to an embodiment of the present disclosure, the cellular module 1521 may perform a distinction and authentication operation on the electronic device 1500 in a communication network by using a SIM (e.g., a SIM card) 1524. According to an embodiment of the present disclosure, the cellular module 1521 may perform at least part of a function that the processor 1510 provides. According to an embodiment of the present disclosure, the cellular module 1521 may further include a communication processor (CP).

Each of the WiFi module 1523, the BT module 1525, the GPS module 1527, and the NFC module 1528 may include a processor for processing data transmitted/received through a corresponding module. According to an embodiment of the present disclosure, at least part (e.g., at least one) of the cellular module 1521, the WiFi module 1523, the BT module 1525, the GPS module 1527, and the NFC module 1528 may be included in one integrated chip (IC) or IC package.

The RF module 1529, for example, may transmit/receive communication signals (e.g., RF signals). The RF module 1529, for example, may include a transceiver, a power amp module (PAM), a frequency filter, a low noise amplifier (LNA), or an antenna. According to another embodiment of the present disclosure, at least one of the cellular module 1521, the WiFi module 1523, the Bluetooth module 1525, the GPS module 1527, and the NFC module 1528 may transmit/receive RF signals through a separate RF module.

The SIM 1524, for example, may include a card including a SIM and/or an embedded SIM and also may include unique identification information (e.g., an integrated circuit card identifier (ICCID)) or subscriber information (e.g., an international mobile subscriber identity (IMSI)).

The memory 1530 (e.g., the memory 130 and the memory 1430) may include an internal memory 1532 or an external memory 1534. The internal memory 1532 may include at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory or NOR flash memory), hard drive, or solid state drive (SSD)).

The external memory 1534 may further include flash drive, for example, compact flash (CF), Secure-Digital (SD), micro Micro-Secure-Digital, Mini-Secure-Digital, extreme digital (xD), MultiMediaCard (MMC), or a memory stick. The external memory 1534 may be functionally and/or physically connected to the electronic device 1500 through various interfaces.

The sensor module 1540 (e.g., the sensor module 170 of FIG. 1) measures physical quantities or detects an operating state of the electronic device 1500, thereby converting the measured or detected information into electrical signals. The sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (e.g., a red, green, blue (RGB) sensor), a biometric sensor 15401, a temperature/humidity sensor 1540J, an illumination sensor 1540K, and an ultra violet (UV) sensor 1540M. Additionally or alternatively, the sensor module 1540 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1540 may further include a control circuit for controlling at least one sensor therein. According to an embodiment of the present disclosure, the electronic device 1500 may further include a processor configured to control the sensor module 1540 as part of or separately from the processor 1510 and thus may control the sensor module 1540 while the processor 1510 is in a sleep state.

The input device 1550 may include a touch panel 1552, a (digital) pen sensor 1554, a key 1556, or an ultrasonic input device 1558. The touch panel 1552 may use at least one of capacitive, resistive, infrared, or ultrasonic methods, for example. Additionally, the touch panel 1552 may further include a control circuit. The touch panel 1552 may further include a tactile layer to provide tactile response to a user.

The (digital) pen sensor 1554, for example, may include a sheet for recognition as part of a touch panel or a separate sheet for recognition. The key 1556 may include a physical button, an optical key, or a keypad, for example. The ultrasonic input device 1558 may detect ultrasonic waves generated from an input tool through a microphone (e.g., the microphone 1588) in order to check data corresponding to the detected ultrasonic waves.

The display 1560 (e.g., the displays 150 and 1460) may include a panel 1562, a hologram device 1564, or a projector 1566. The panel 1562 may have the same or similar configuration to the display of FIG. 2 or FIG. 14. The panel 1562 may be implemented to be flexible, transparent, or wearable, for example. The panel 1562 and the touch panel 1552 may be configured with one module. The hologram 1564 may show three-dimensional images in the air by using the interference of light. The projector 1566 may display an image by projecting light on a screen. The screen, for example, may be placed inside or outside the electronic device 1500. According to an embodiment of the present disclosure, the display 1560 may further include a control circuit for controlling the panel 1562, the hologram device 1564, or the projector 1566.

The interface 1570 may include a high-definition multimedia interface (HDMI) 1572, a universal serial bus (USB) 1574, an optical interface 1576, or a D-subminiature (sub) 1578, for example. The interface 1570, for example, may be included in the communication interfaces 170, 270, and 370 shown in FIGS. 1, 2, and 3. Additionally or alternatively, the interface 1570 may include a mobile high-definition link (MHL) interface, a secure Digital (SD) card/multi-media card (MMC) interface, or an infrared data association (IrDA) standard interface.

The audio module 1580 may convert sound into electrical signals and convert electrical signals into sounds. At least some components of the audio module 1580, for example, may be included in the input/output interfaces shown in FIGS. 2 and 14. The audio module 1580 may process sound information inputted/outputted through a speaker 1582, a receiver 1584, an earphone 1586, or a microphone 1588.

The camera module 1591, as a device for capturing a still image and a video, may include at least one image sensor (e.g., a front sensor or a rear sensor), a lens (not shown), an image signal processor (ISP) (not shown), or a flash (not shown) (e.g., an LED or a xenon lamp).

The power management module 1595 may manage the power of the electronic device 1500. According to an embodiment of the present disclosure, the power management module 1595 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1596, or a voltage, current, or temperature thereof during charging. The battery 1596, for example, may include a rechargeable battery and/or a solar battery.

The indicator 1597 may display a specific state of the electronic device 1500 or part thereof (e.g., the processor 1510), for example, a booting state, a message state, or a charging state. The motor 1598 may convert electrical signals into mechanical vibration and may generate vibration or haptic effect. Although not shown in the drawings, the electronic device 1500 may include a processing device (e.g., a GPU) for mobile TV support. A processing device for mobile TV support may process media data according to the standards such as digital multimedia broadcasting (DMB), digital video broadcasting (DVB), or mediaFLO.

Figure 16:
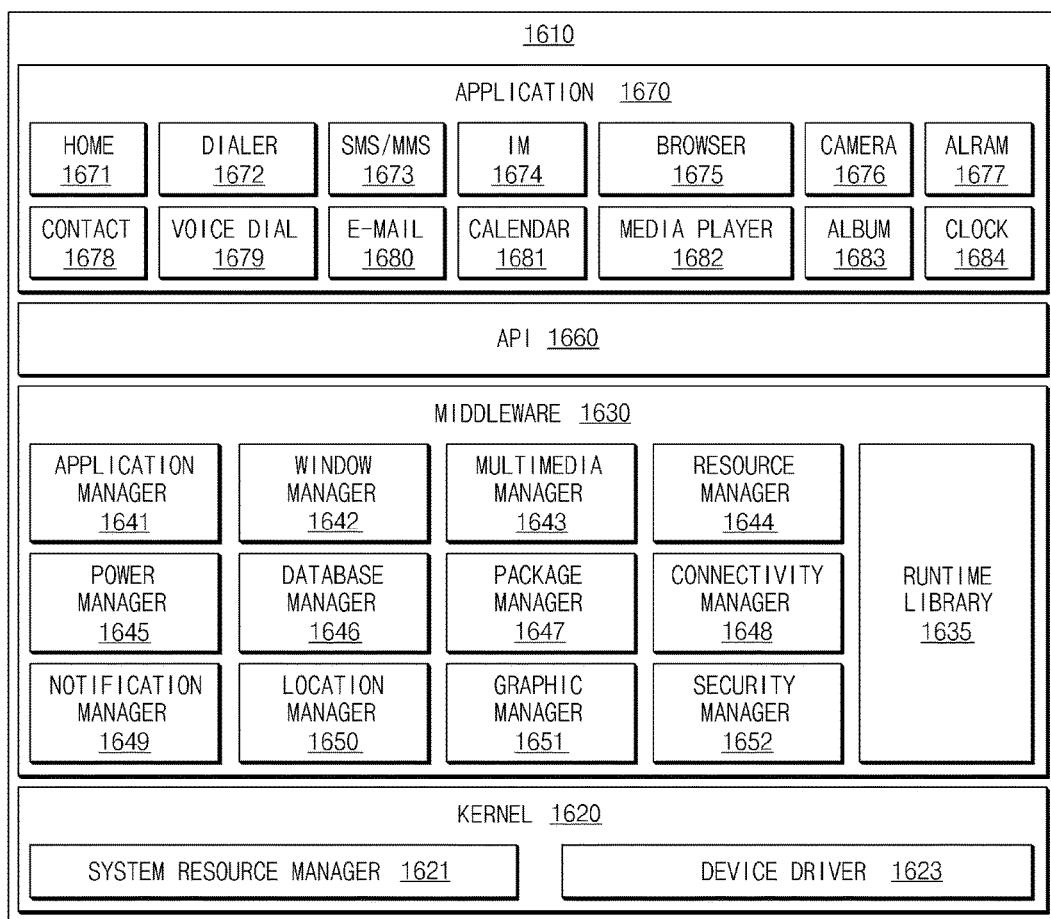
FIG. 16 is a block diagram illustrating a program module according to various embodiments of the present disclosure.

FIG. 16 is a block diagram illustrating a program module according to various embodiments of the present disclosure.

Referring to FIG. 16, according to an embodiment, the program module 1610 (e.g., the program 1440) may include an operating system (OS) for controlling a resource relating to an electronic device (e.g., the electronic devices 100a, 100b, and 100) and/or various applications (e.g., the application program 1447) running on the OS. The OS, for example, may include android, iOS, windows, Symbian, Tizen, or Bada.

The program module 1610 may include a kernel 1620, a middleware 1630, an API 1660, and/or an application 1670. At least part of the program module 1610 may be preloaded on an electronic device or may be downloaded from an external electronic device (e.g., the electronic devices 100, 100a, 100b, and 1402 and the server 1406).

The kernel 1620 (e.g., the kernel 1441), for example, may include a system resource manager 1621, or a device driver 1623. The system resource manager 1621 may perform the control, allocation, or retrieval of a system resource. According to an embodiment of the disclosure, the system resource manager 1621 may include a process management unit, a memory management unit, or a file system management unit. The device driver 1623, for example, a display driver, a camera driver, a Bluetooth driver, a sharing memory driver, a USB driver, a keypad driver, a WiFi driver, an audio driver, or an inter-process communication (IPC) driver.

The middleware 1630, for example, may provide a function that the application 1670 requires commonly, or may provide various functions to the application 1670 through the API 1660 in order to allow the application 1670 to efficiently use a limited system resource inside the electronic device. According to an embodiment of the disclosure, the middleware 1630 (e.g., the middleware 1443) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635, for example, may include a library module that a complier uses to add a new function through a programming language while the application 1670 is running. The runtime library 1635 may perform a function on input/output management, memory management, or an arithmetic function.

The application manager 1641, for example, may mange the life cycle of at least one application among the applications 1670. The window manager 1642 may manage a GUI resource used in a screen. The multimedia manager 1643 may recognize a format for playing various media files and may encode or decode a media file by using the codec corresponding to a corresponding format. The resource manager 1644 may manage a resource such as a source code, a memory, or a storage space of at least any one of the applications 1670.

The power manager 1645, for example, may operate together with a basic input/output system (BIOS) to manage the battery or power and may provide power information necessary for an operation of the electronic device. The database manager 1646 may create, search, or modify a database used in at least one application among the applications 1670. The package manager 1647 may manage the installation or update of an application distributed in a package file format.

The connectivity manger 1648 may manage a wireless connection such as WiFi or Bluetooth. The notification manager 1649 may display or notify an event such as arrival messages, appointments, and proximity alerts to a user in a manner of not interrupting the user. The location manager 1650 may manage location information on an electronic device. The graphic manager 1651 may manage a graphic effect to be provided to a user or a user interface relating thereto. The security manager 1652 may provide various security functions necessary for system security or user authentication. According to an embodiment, when an electronic device (e.g., the electronic device 161) includes a phone function, the middleware 1630 may further include a telephony manager for managing a voice or video call function of the electronic device.

The middleware 1630 may include a middleware module for forming a combination of various functions of the above-mentioned components. The middleware 1630 may provide a module specialized for each type of OS to provide differentiated functions. Additionally, the middleware 1630 may delete part of existing components or add new components dynamically.

The API 1660 (e.g., the API 1445), for example, as a set of API programming functions, may be provided as another configuration according to OS. For example, in the case of android or iOS, one API set may be provided for each platform and in the case Tizen, at least two API sets may be provided for each platform.

The application 1670 (e.g., the application program 1447) may include at least one application for providing functions such as a home 1671, a dialer 1672, an SMS/MMS 1673, an instant message 1674, a browser 1675, a camera 1676, an alarm 1677, a contact 1678, a voice dial 1679, an e-mail 1680, a calendar 1681, a media player 1682, an album 1683, a clock 1684, health care (e.g., measure an exercise amount or blood sugar), or environmental information provision (e.g., provide air pressure, humidity, or temperature information).

According to an embodiment, the application 1670 may include an application (hereinafter referred to as "information exchange application") for supporting information exchange between the electronic device (e.g., the electronic device 100a) and an external electronic device (e.g., the electronic devices 100b). The information exchange application, for example, may include a notification relay application for relaying specific information to the external device or a device management application for managing the external electronic device.

For example, the notification relay application may have a function for relaying to an external electronic device (e.g., electronic devices 100a and 100b) notification information occurring from another application (e.g., an SMS/MMS application, an e-mail application, a health care application, or an environmental information application) of the electronic device. Additionally, the notification relay application may receive notification information from an external electronic device and may then provide the received notification information to a user.

The device management application, for example, may manage (e.g., install, delete, or update) at least one function (turn-on/turn off of the external electronic device itself (or some components) or the brightness (or resolution) adjustment of a display) of an external electronic device (e.g., the electronic devices 100a and 100b) communicating with the electronic device, an application operating in the external electronic device, or a service (e.g., call service or message service) provided from the external device.

According to an embodiment of the disclosure, the application 1670 may include a specified application (e.g., a health care application of a mobile medical device) according to the property of an external electronic device (e.g., the electronic devices 102, 200, and 300). According to an embodiment, the application 1670 may include an application received from an external electronic device (e.g., the server 1406 or the electronic device 1402). According to an embodiment of the disclosure, the application 1670 may include a preloaded application or a third party application downloadable from a server. The names of components in the program module 1610 according to the shown embodiment may vary depending on the type of OS.

According to various embodiments of the present disclosure, at least part of the program module 1610 may be implemented with software, firmware, hardware, or a combination thereof. At least part of the programming module 1610, for example, may be implemented (e.g., executed) by a processor (e.g., the processors 120 and 1420). At least part of the programming module 1610 may include a module, a program, a routine, sets of instructions, or a process to perform at least one function, for example.

Various embodiments of the present disclosure may support to automatically execute call forwarding according to an operation situation between electronic devices even if there is no user's manipulation.

Additionally, according to various embodiments of the present disclosure, based on a movement determination, a user may support call forwarding that is substantially capable of processing a received call signal.

Additionally, various embodiments of the present disclosure may support to perform an efficient energy management by controlling the power of a communication module according to a call forwarding performance.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (e.g., modules or functions thereof) or a method (e.g., operations) according to this disclosure, for example, as in a form of a programming module, may be implemented using an instruction stored in computer-readable storage media. When at least one processor executes an instruction, it may perform a function corresponding to the instruction. The non-transitory computer-readable storage media may include the memory 130 and the memory 1430, for example.

The non-transitory computer-readable storage media may include hard disks, floppy disks, magnetic media (e.g., magnetic tape), optical media (e.g., CD-ROM, and DVD), magneto-optical media (e.g., floptical disk), and hardware devices (e.g., ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

According to various embodiments of the present disclosure, a computer recording medium may store an instruction driven by at least one processor. The instruction may be set to perform detecting a short range communication or wired communication based communication channel operation change and performing a process to allow a call signal to be received from a communication service device to be received by itself or another electronic device in correspondence to its movement or a movement of the other electronic device connected through the second communication module or having a connection history during the communication channel operation change.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A mobile electronic device operable to communicate with a wearable electronic device, the mobile electronic device comprising:
a sensor module configured to collect sensing information of the mobile electronic device;
a first communication module configured to perform a communication based on a call signal;
wherein the call signal applies for a connection between the mobile electronic device and an external electronic device through a base station,
a second communication module configured to perform a short range communication or wired communication; and
a processor configured to:
process the call signal reception associated with the first communication module, and
allow one of the mobile electronic device and the wearable electronic device to receive the call signal based on at least one of a movement information of the mobile electronic device corresponding to the sensing information and a movement information of the wearable electronic device if a link-loss of the short range communication between the mobile electronic device and the wearable electronic device occurs;
wherein the processor is configured to process a reception path setting of the call signal corresponding to a movement determination when a link-loss of the short range communication occurs with a link and
the processor restores a call forwarding state switched corresponding to the link-loss occurrence to a previous state when the link is reconnected.

2. The mobile electronic device of claim 1, wherein the processor is configured to determine a movement state of the mobile electronic device based on the sensing information obtained from the sensor module and if the movement state of the mobile electronic device is less than a specified value, to allow the second wearable electronic device to receive the call signal.

3. The mobile electronic device of claim 1, wherein the processor is configured to determine a movement state of the mobile electronic device based on the sensing information obtained from the sensor module and if the movement state of the mobile electronic device is equal to or greater than a specified value, is configured to allow the mobile electronic device to receive the call signal.

4. The mobile electronic device of claim 1, wherein the processor is configured to perform at least one of a) a determining of a movement state of the wearable electronic device based on the sensing information received from the wearable electronic device, and b) a checking of a movement state value received from the wearable electronic device, and if the movement state of the wearable electronic device is less than a specified value, to allow the mobile electronic device to receive the call signal.

5. The mobile electronic device of claim 1, wherein the processor is configured to perform at least one of a) a determining of a movement state of the wearable electronic device based on sensing information received from the wearable electronic device, and b) a checking of a movement state value received from the wearable electronic device, and if the movement state of the wearable electronic device is equal to or greater than a specified value, to allow the wearable electronic device to receive the call signal.

6. The mobile electronic device of claim 1, wherein the processor is configured to output at least one of a call forwarding switching and a call forwarding non-switching selection related item.

7. The mobile electronic device of claim 1, wherein the processor is configured to turn off the first communication module when call forwarding is switched.

8. The mobile electronic device of claim 1, wherein the processor is configured to provide setting information relating to call forwarding switching to a communication service device relating to the first communication module.

9. A communication service operating method between a mobile electronic device and a second wearable electronic device, the mobile electronic device having a sensor module, the method comprising:
processing a call signal associated with a communication module of the electronic device wherein the call signal applies for a connection between the mobile electronic device and an external electronic device through a base station:
allowing one of the mobile electronic device and the wearable electronic device to receive the call signal based on at least one of a movement information of the mobile electronic device based on sensing information and movement information of the wearable electronic device when a link-loss of a short range communication between the mobile electronic device and the wearable electronic device occurs;
further comprising processing a reception path setting of the call signal corresponding to a movement determination when a link-loss of the short range communication occurs with a link and restoring a switched call forwarding state to a previous state when the link is reconnected.

10. The method of claim 9, wherein allowing one of the mobile electronic device and the wearable electronic device to receive a call signal comprises:
determining a movement state of the mobile electronic device based on the sensing information; and
when the movement state of the mobile electronic device is less than a specified value, allowing the wearable electronic device to receive the call signal.

11. The method of claim 9, wherein allowing one of the mobile electronic device and the wearable electronic device to receive a call signal comprises:
determining a movement state of the mobile electronic device based on the sensing information; and
when the movement state of the mobile electronic device is equal to or greater than a specified value, allowing the mobile electronic device to receive the call signal.

12. The method of claim 9, wherein allowing one of the mobile electronic device and the wearable electronic device to receive a call signal comprises:
at least one of a) determining a movement state of the wearable electronic device based on sensing information received from the wearable electronic device, and b) receiving a movement state value from the wearable electronic device; and
when the movement state of the wearable electronic device is less than a specified value, allowing the mobile electronic device to receive the call signal.

13. The method of claim 9, wherein allowing one of the mobile electronic device and the wearable electronic device to receive a call signal comprises:
determining a movement state of the wearable electronic device based on at least one of sensing information received from the wearable electronic device and receiving a movement state value of the wearable electronic device; and
when the movement state of the wearable electronic device is equal to or greater than a specified value, allowing the wearable electronic device to receive the call signal.

14. The method of claim 9, further comprising outputting at least one of a call forwarding switching and a call forwarding non-switching selection related item.

15. The method of claim 9, further comprising turning off the communication module when call forwarding is switched.

16. The method of claim 9, further comprising providing setting information relating to call forwarding switching to a communication service device relating to the communication module.

* * * * *